United States Patent
Tamiya et al.

(10) Patent No.: US 7,995,212 B2
(45) Date of Patent: Aug. 9, 2011

(54) OPTICAL DISPLACEMENT MEASURING DEVICE

(75) Inventors: Hideaki Tamiya, Kanangawa (JP); Akihiro Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 12/382,314

(22) Filed: Mar. 13, 2009

(65) Prior Publication Data

US 2009/0257066 A1      Oct. 15, 2009

(30) Foreign Application Priority Data

Apr. 14, 2008   (JP) ................................. 2008-105047

(51) Int. Cl.
- G01B 11/02    (2006.01)
- G01B 9/02     (2006.01)
- G01D 5/34     (2006.01)

(52) U.S. Cl. .................. 356/499; 356/494; 250/231.16
(58) Field of Classification Search .................. 356/488, 356/494, 499, 521; 250/231.16

See application file for complete search history.

(56) References Cited

U.S. PATENT DOCUMENTS

| | | | |
|---|---|---|---|
| 4,930,895 A | | 6/1990 | Nishimura et al. |
| 4,979,826 A | * | 12/1990 | Ishizuka et al. ............... 356/499 |
| 5,051,579 A | * | 9/1991 | Tsukiji et al. ............ 250/231.16 |
| 6,166,817 A | | 12/2000 | Kuroda |
| 6,407,815 B2 | * | 6/2002 | Akihiro .......................... 356/499 |
| 7,034,948 B2 | * | 4/2006 | Tamiya et al. ................ 356/499 |
| 7,336,367 B2 | * | 2/2008 | Tamiya et al. ................ 356/494 |

FOREIGN PATENT DOCUMENTS

| | | |
|---|---|---|
| JP | 63-311121 | 12/1988 |
| JP | 04050720 A   * | 2/1992 |
| JP | 2000-081308 | 3/2000 |

* cited by examiner

Primary Examiner — Michael A Lyons
(74) Attorney, Agent, or Firm — Rader, Fishman & Grauer PLLC

(57) ABSTRACT

An optical displacement measuring device includes a diffraction grating, a reflecting optical system configured to irradiate two one-time diffracted beams diffracted at the diffraction grating on the diffraction grating again, and the reflecting optical system includes a first imaging element, a second imaging element, a first reflector, and a second reflector, wherein the focal length of the first imaging element and the focal length of the second imaging element are the same, the diffraction grating and first reflector are disposed around the focal position of the first imaging element, and the diffraction grating and second reflector are disposed around the focal position of the second imaging element, thereby suppressing influence of displacement of the diffraction grating as to other than a direction where a movement position is detected.

12 Claims, 18 Drawing Sheets

C1, C2 DIRECTIONS: GRATING DIRECTIONS
D1, D2 DIRECTIONS: GRATING VECTOR DIRECTIONS
E1, E2 DIRECTIONS: NORMAL VECTOR DIRECTIONS

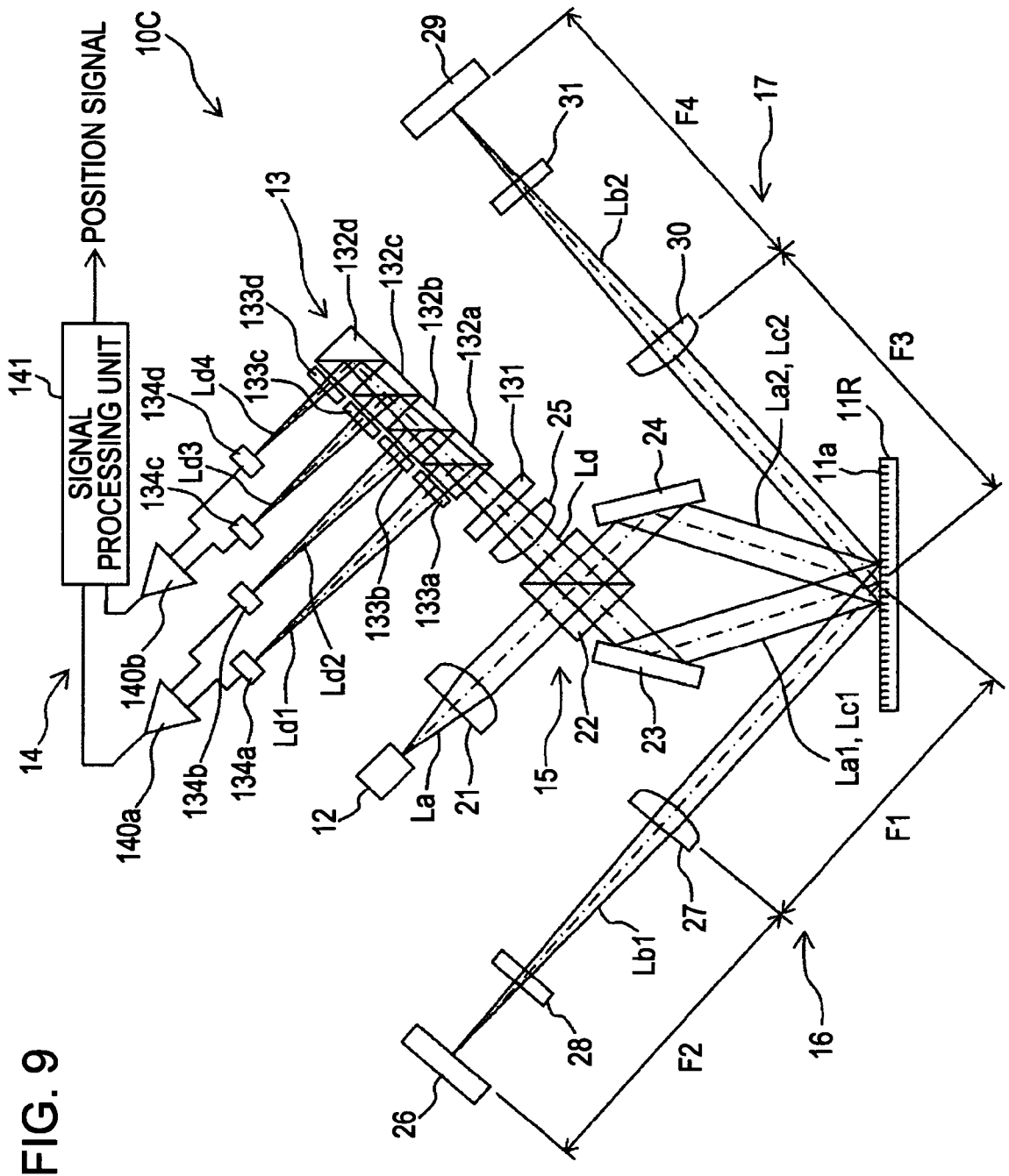

OPTICAL DISPLACEMENT MEASURING DEVICE

BACKGROUND OF THE INVENTION

1. Field of the Invention

The present invention relates to an optical displacement measuring device for detecting the relative movement position of a movable portion such as a tooling machine, a semiconductor manufacturing device, or the like. More specifically, the present invention suppresses influence of displacement of a diffraction grating to other than a direction where a movement position is detected with reflecting optical systems for irradiating two diffracted beams diffracted at the diffraction grating on the diffraction grating again by setting the focal lengths of imaging devices of the respective reflecting optical systems to the same and disposing the diffraction grating and a reflector around the focal positions of the imaging elements.

2. Description of the Related Art

Heretofore, an optical displacement measuring device employing a diffraction grating has been employed as a device for detecting the relative movement position of a movable portion such as a tooling machine, a semiconductor manufacturing device, or the like (e.g., see Japanese Unexamined Patent Application No. 2000-81308 and Japanese Examined Patent Application No. 63-311121).

With an optical displacement measuring device according to the related art, a coherent beam emitted from a coherent light source is divided into two coherent beams at a beam splitter or the like, and these are irradiated on a diffraction grating. The two coherent beams irradiated on the diffraction grating are diffracted at the diffraction grating to generate two one-time diffracted beams. The two one-time diffracted beams are reflected at reflecting optical systems, are returned on the same optical paths, and are irradiated on the diffraction grating again.

The two one-time diffracted beams irradiated on the diffraction grating are diffracted at the diffraction grating to generate two two-time diffracted beams. The two two-time diffracted beams are returned on the same optical paths as the two coherent beams and are input to the beam splitter. The two two-time diffracted beams input to the beam splitter are overlapped at the beam splitter, and an interference beam obtained by causing the two two-time diffracted beams to interfere with each other is imaged on a light receiving element.

With the optical displacement measuring device having such a configuration, the diffraction grating moves to a grating vector direction according to movement of a movable portion, thereby causing a phase difference between the two two-time diffracted beams. The optical displacement measuring device detects an interference signal by causing the two two-time diffracted beams to interfere with each other, and obtaining the phase difference between the two two-time diffracted beams from the interference signal to detect the movement position of the diffraction grating.

With an optical displacement measuring device according to the related art, two coherent beams are imaged on the diffraction grating, and also the one-time diffracted beams diffracted at the diffraction grating are irradiated on reflectors by imaging elements as collimated beams. The one-time diffracted beams diffracted at the reflectors are returned on the same optical paths and are imaged on the diffraction grating by imaging elements.

Thus, with an optical displacement measuring device according to the related art, the one-time diffracted beams diffracted at the diffraction grating are returned on the same optical paths as those at the time of inputting. Also, the imaged positions on the grating plane of the diffraction grating are not changed, and the optical axes of two-time diffracted beams generated by the one-time diffracted beams being diffracted are not shifted. Also, no change in the optical path lengths occurs. Accordingly, even if the diffraction grating is subjected to posture change, the interference signal between the two two-time diffracted beams is not readily disordered, thereby enabling stable detection.

SUMMARY OF THE INVENTION

With an optical displacement measuring device according to the related art, the coherent beams and one-time diffracted beams irradiated on the diffraction grating have been imaged on the grating plane of the diffraction grating, and accordingly, with posture change wherein the diffraction grating has moved in a direction perpendicular to the grating plane, the diffracted beams to interfere have been shifted, and the interference signal has become small, resulting in difficulty in detecting the position of the diffraction grating.

Also, with an optical displacement measuring device according to the related art, imaging has been performed on the grating plane of the diffraction grating, so the distance between the diffraction grating and the imaging elements has been maintained to some extent. Further, imaging has been performed on the grating plane of the diffraction grating, and the amplitude of the interference signal has fluctuated due to a foreign object on the grating plane. Accordingly, the external inspection of the diffraction grating has to be performed rigorously.

There has been found demand to provide an optical displacement measuring device capable of detecting the position of the diffraction grating with high resolution without receiving influence of the posture change of the diffraction grating.

According to an embodiment of the present invention, an optical displacement measuring device includes: a diffraction grating configured to move relatively in a direction parallel to a grating vector as to a coherent beam to be irradiated to diffract this coherent beam; a light emitting unit configured to emit a coherent beam; an irradiated light receiving optical system configured to divide a coherent beam emitted from the light emitting unit into two coherent beams, irradiate each coherent beam on the diffraction grating to generate two one-time diffracted beams, and cause two two-time beams generated by diffracting two one-time beams through the diffraction grating to interfere with each other; a reflecting optical system configured to reflect each of two one-time diffracted beams generated by diffracting two coherent beams through the diffraction grating to irradiate two one-time diffracted beams on the diffraction grating; and a light receiving unit configured to receive an interference beam obtained by causing two two-time diffracted beams to interfere with each other by the irradiated light receiving optical system to detect an interference signal, with the irradiated light receiving optical system including a first imaging element configured to condense a coherent beam emitted from the light emitting unit, and a second imaging element configured to image a two-time diffracted beam diffracted at the diffraction grating, with the reflecting optical system including a third imaging element between one reflector configured to reflect one of two one-time diffracted beams generated by being diffracted through the diffraction grating to irradiate this on the diffraction grating, and the diffraction grating, and a fourth imaging element between the other reflector configured to reflect the other of the two one-time diffracted beams to irradiate this on the diffraction grating, and the diffraction grating, and with the third imaging element and the fourth imaging element having the same focal length, the diffraction grating being disposed in one focal position of the third imaging element and the fourth imaging element, and one of the reflectors being disposed in the other focal position of the third imaging element, and the other of the reflectors being disposed in the other focal position of the fourth imaging element.

With the above configuration, the coherent beam emitted from the light emitting unit is condensed by the first imaging element, and a collimated beam is irradiated on the grating plane of the diffracted grating. One of the two one-time diffracted beams diffracted off the diffraction grating is imaged by the third imaging element which is one of the reflecting optical systems and is irradiated on the reflector perpendicularly. Also, the other of the two one-time diffracted beams diffracted off the diffraction grating is imaged by the fourth imaging element which is the other of the reflecting optical systems and is irradiated on the reflector perpendicularly.

Accordingly, even in a case where the optical axis of a one-time diffracted beam is shifted due to the posture change in the diffraction grating, the reflected one-time diffracted beam returns parallel to the beam at the time of input, and a two-time diffracted beam generated by the one-time diffracted beam being diffracted keeps the optical path thereof generally parallel to the coherent beam. Two two-time diffracted beams are overlapped at the irradiated light receiving optical system.

With an embodiment of the optical displacement measuring device according to the present invention, the focal lengths of the imaging elements are set equally, and the diffraction grating and reflector are disposed around the focal positions of the imaging elements at the respective reflecting optical systems for irradiating the two one-time diffracted beams diffracted at the diffraction grating on the diffraction grating again, whereby the two two-time diffracted beams are overlapped and interfere with each other without being shifted.

Thus, in a case where the diffraction grating moves other than a direction parallel to the grating vector, for example, even in a case where the diffraction grating moves in parallel to a direction perpendicular to the grating plane, the diffraction grating is inclined, or the diffraction grating includes an undulation, or the like, the interference signal to detect does not deteriorate. Accordingly, with the optical displacement measuring device according to the present invention, the movement of a movable portion can be detected with high resolution and high precision.

BRIEF DESCRIPTION OF THE DRAWINGS

FIG. 9 is a configuration diagram illustrating an example of an optical displacement measuring device according to a third embodiment of the present invention;

DESCRIPTION OF THE PREFERRED EMBODIMENTS

Figure 1:
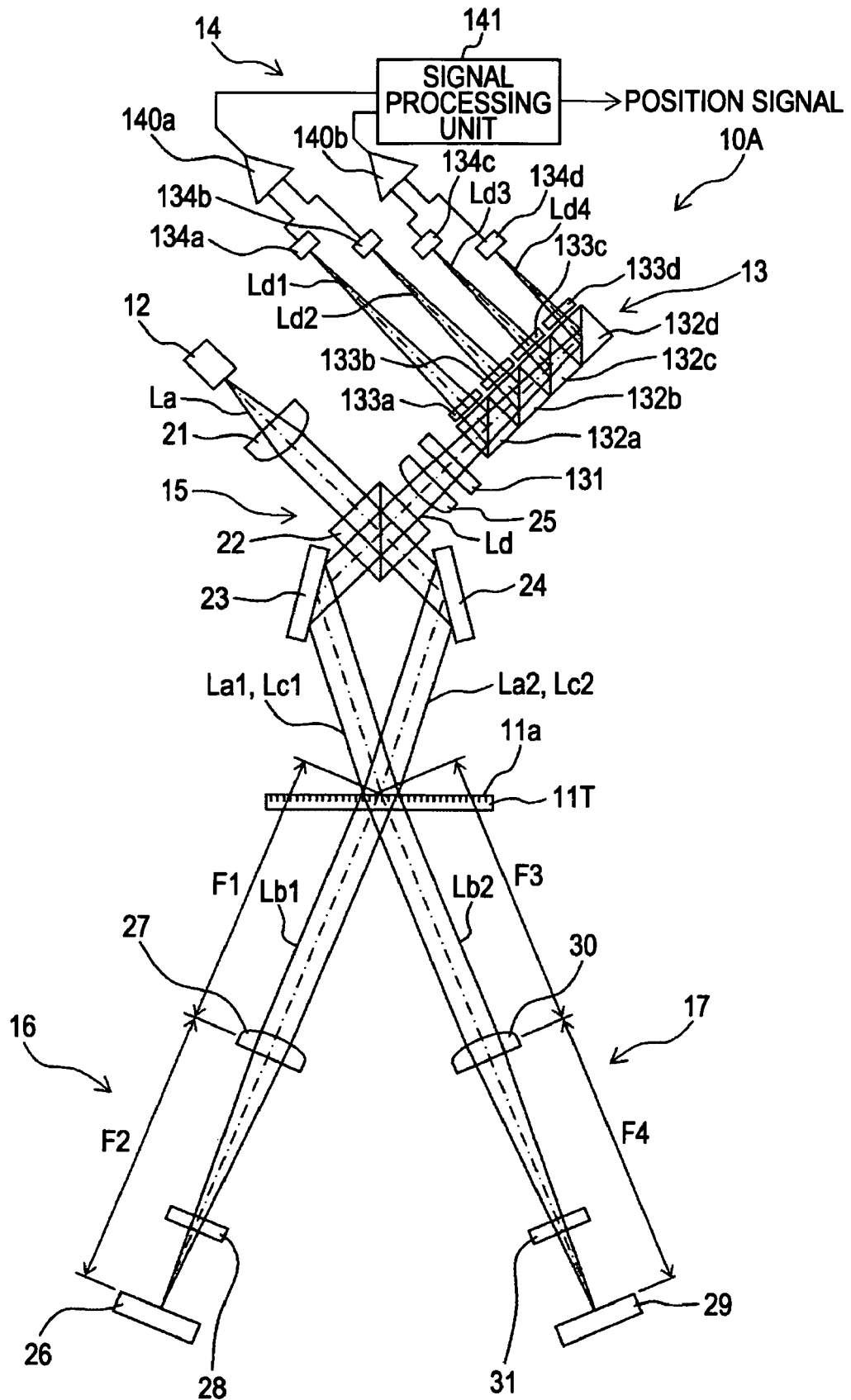
FIG. 1 is a configuration diagram illustrating an example of an optical displacement measuring device according to a first embodiment of the present invention.

Embodiments of the optical displacement measuring device according to the present invention will be described below with reference to the drawings. Configuration example of the optical displacement measuring device according to the first embodiment FIG. 1 is a configuration diagram illustrating an example of an optical displacement measuring device according to a first embodiment of the present invention.

An optical displacement measuring device 10A according to the first embodiment of the present invention includes a diffraction grating 11T attached to a movable portion such as a tooling machine or the like carries out linear movement, and a coherent beam source 12 for emitting a coherent beam La such as a laser beam or the like.

Also, the optical displacement measuring device 10A includes a light receiving unit 13 for receiving two two-time diffracted beams Lc1 and Lc2 which interferes to generate an interference signal, and a position detecting unit 14 for detecting the movement position of the diffraction grating 11T based on the interference signal from the light receiving unit 13.

Further, the optical displacement measuring device 10A includes an irradiated light receiving optical system 15 which divides a coherent beam La emitted from the coherent beam source 12 into two coherent beams La1 and La2 to irradiate these on the diffraction grating 11T, and causes the two-time diffracted beams Lc1 and Lc2 from the diffraction grating 11T to interfere with each other to irradiate these on the light receiving unit 13.

Also, the optical displacement measuring device 10A includes reflecting optical systems 16 and 17 which reflect two one-time diffracted beams Lb1 and Lb2 from the diffraction grating 11T and irradiated these on the diffraction grating 11T again.

Figure 2:
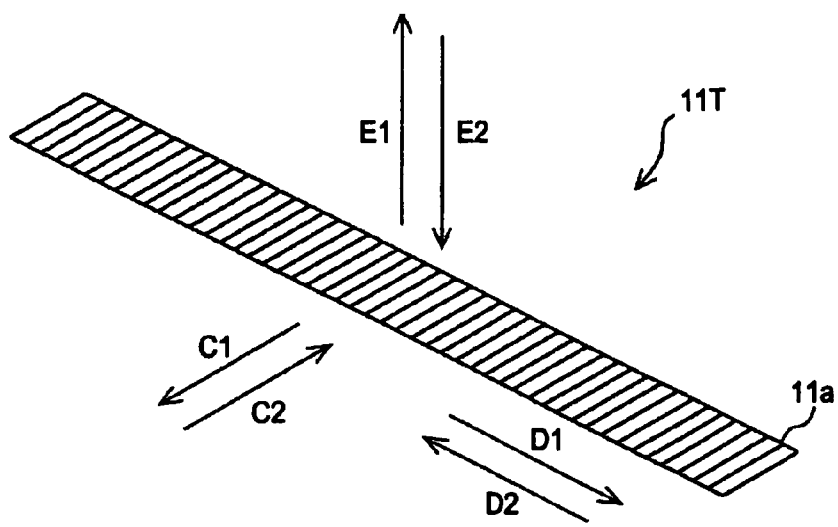
FIG. 2 is a perspective view illustrating an example of a diffraction grating employed for optical displacement measuring devices according to the respective embodiments of the present invention.

FIG. 2 is a perspective view illustrating an example of a diffraction grating employed for optical displacement measuring devices according to the respective embodiments of the present invention. The diffraction grating 11T has, for example, a thin plate shape, and on the surface thereof gratings such as narrow slits or grooves or the like are carved for each predetermined interval. The optical beam input to such a diffraction grating 11T is diffracted by a slit or the like carved on the surface. The diffracted beam to be generated due to diffraction is generated in a direction determined with the interval of the gratings and the wavelength of an optical beam.

Now, before describing the embodiments of the present invention, the plane of the diffraction grating 11T on which the gratings are formed will be referred to as a grating plane 11a. Note that, with the optical displacement measuring device 10A shown in FIG. 1, a transmission type diffraction grating is employed as the diffraction grating 11T, and in a case where the diffraction grating 11T is a transmission type, a plane where a coherent beam is input, and the plane where a diffracted beam is generated will be referred both to as a grating plane 11a.

Also, directions where the gratings of the diffraction gratings 11T are formed (arrow C1, C2 directions in FIG. 2), i.e., a direction perpendicular to a grating vector representing the direction of change, such as the transmittance and reflectance of the gratings, the depths of the grooves, and so forth, and also directions parallel to the grating plane 11a will be referred to as grating directions.

Directions perpendicular to the direction where the gratings are formed, and also parallel to the grating plane 11a (arrow D1, D2 directions in FIG. 2), i.e., directions parallel to the grating vector of the diffraction grating 11T will be referred to as grating vector directions.

Also, directions perpendicular to the grating plane 11a (arrow E1, E2 directions in FIG. 2), i.e., directions perpendicular to the grating direction and also perpendicular to the grating vector direction will be referred to as normal vector directions. Note that these respective directions of the diffraction grating 11T will be referred in the same way with not only the first embodiment of the present invention but also the other embodiments thereof.

The diffraction grating 11T is attached to a movable portion such as a tooling machine or the like and moves in the arrow D1 or D2 direction in FIG. 2, i.e., the grating vector direction along with the movement of this movable portion. Note that with the present invention, the type of the diffraction grating 11T is not restricted, and not only diffraction grating where grooves or the like are formed mechanically but also a diffraction grating created by interference patterns being printed on a photosensitive resin may be employed.

The coherent beam source 12 shown in FIG. 1 is an example of a light emitting unit, which is an element for emitting a coherent beam such as a laser beam or the like. As example made up of a multi-mode semiconductor laser for emitting a laser beam with coherent distance of around several hundred μm, or the like is shown as the coherent beam source 12, but a single-mode laser diode, super luminescent diode, or light emitting diode may be employed wherein high-frequency superposition is applied to a driving current.

The light receiving unit 13 includes a quarter-wave plate 131 for converting the polarized state of an interference beam Ld generated by causing the two-time diffracted beams Lc1 and Lc2 from the diffraction grating 11T to interfere with each other, beam splitters 132a, 132b, 132c, and 132d serving as optical dividing elements for dividing the interference beam Ld into four, and polarizers 133a, 133b, 133c, and 133d for transmitting only predetermined polarization components of the four divided interference beams Ld1, Ld2, Ld3, and Ld4.

Also, the light receiving unit 13 includes light receiving elements 134a, 134b, 134c, and 134d for receiving predetermined polarization components which have transmitted through the polarizers 133a, 133b, 133c, and 133d, of the interference beams Ld1, Ld2, Ld3, and Ld4 divided into four by the beam splitters 132a, 132b, 132c, and 132d, respectively.

The quarter-wave plate 131 converts the coherent beam Ld into a circular polarized beam. The beam splitter 132a inputs the coherent beam Ld passed through the quarter-wave plate 131, reflects a portion of the input coherent beam Ld to generate a coherent beam Ld1, and transmits the remaining portion of the input coherent Ld.

The beam splitter 132b, which is disposed on the subsequent stage of the beam splitter 132a, inputs the coherent beam Ld passed through the beam splitter 132a, reflects a portion of the input coherent beam Ld to generate a coherent beam Ld2, and transmits the remaining portion of the input coherent Ld.

The beam splitter 132c, which is disposed on the subsequent stage of the beam splitter 132b, inputs the coherent beam Ld passed through the beam splitter 132b, reflects a portion of the input coherent beam Ld to generate a coherent beam Ld3, and transmits the remaining portion of the input coherent Ld.

The beam splitter 132d, which is disposed on the subsequent stage of the beam splitter 132c, inputs the coherent beam Ld passed through the beam splitter 132c and reflects the input coherent beam Ld totally to generate a coherent beam Ld4.

The respective reflectance ratios of the beam splitters 132a, 132b, 132c, and 132d are set to 1/4, 1/3, 1/2, and 1, respectively. Thus, the input coherent beam Ld can be divided into four interference beams Ld1, Ld2, Ld3, and Ld4 generally with the same light quantity.

The polarizers 133a, 133b, 133c, and 133d provide a different optical axis to each of the interference beams Ld which are synthetic waves between the circular polarized beams passed through the quarter-wave plate 131, and divided into four by the beam splitters 132a, 132b, 132c, and 132d.

Specifically, the polarizer 133a transmits, with the present example, only polarized beam components of 0° regarding the coherent beam Ld1 reflected at the beam splitter 132a and causes the light receiving element 134a to receive these. The polarizer 133b transmits, with the present example, only polarized beam components of 5° regarding the coherent beam Ld2 reflected at the beam splitter 132b and causes the light receiving element 134b to receive these. The polarizer 133c transmits, with the present example, only polarized beam components of 90° regarding the coherent beam Ld3 reflected at the beam splitter 132c and causes the light receiving element 134c to receive these. The polarizer 133d transmits, with the present example, only polarized beam components of 135° regarding the coherent beam Ld4 reflected at the beam splitter 132d and causes the light receiving element 134d to receive these.

The light receiving elements 134a, 134b, 134c, and 134d are photoelectric conversion elements for converting an optical beam irradiated on each of the light receiving faces into an electric signal corresponding to the light quantity thereof and are made up of a photo detector or the like. These light receiving elements 134a, 134b, 134c, and 134d receive each interference beam Ld1, Ld2, Ld3, and Ld4 irradiated on the corresponding light receiving face to generate an interference signal according to the light quantity thereof.

With the position detecting unit 14, the electric signals output from the light receiving units 134a and 134b are input to a differential amplifier 140a, and the differential output between the electric signals from the light receiving elements 134a and 134b is obtained at the differential amplifier 140a, and a differential signal where the DC components of the interference signal are canceled is output.

Also, the electric signals output from the light receiving units 134c and 134d are input to a differential amplifier 140b, and the differential output between the electric signals from the light receiving elements 134c and 134d is obtained at the differential amplifier 140b, and a differential signal where the DC components of the interference signal are canceled is output.

Accordingly, the two differential signals wherein the output DC components are canceled with a different phase of 180° at each pair of the light receiving elements 134a and 134b, and the light receiving elements 134c and 134d, are input to a signal processing unit 141. With the signal processing unit 141, a phase difference is obtained based on the interference signals generated by the light receiving elements 134a, 134b, 134c, and 134d, and a position signal indicating the relative movement position of the diffraction grating 11T is output.

The irradiated light receiving optical system 15 includes a first imaging element 21 which condenses the coherent beam La emitted from the coherent beam source 12. Also, the irradiated light receiving optical system 15 includes a polarization beam splitter 22 which divides the coherent beam La emitted from the coherent beam source 12 into two coherent beams La1 and La2, and causes the two two-time diffracted beams Lc1 and Lc2 from the diffraction grating 11T to overlap and interfere with each other.

Further, the irradiated light receiving optical system 15 includes a reflector 23 which reflects one coherent beam La1 divided by the polarization beam splitter 22, and also reflects the two-time diffracted beam Lc1 generated by the coherent beam La1.

Also, the irradiated light receiving optical system 15 includes a reflector 24 which reflects the other coherent beam La2 divided by the polarization beam splitter 22 and also reflects the two-time diffracted beam Lc2 generated by the coherent beam La2. Further, the irradiated light receiving optical system 15 includes a second imaging element 25 which condenses the interference beam Ld overlapped by the polarization beam splitter 22.

The first imaging element 21 is made up of an optical element such as a lens including a predetermined numeric aperture, or the like. The coherent beam La emitted from the coherent beam source 12 is input to the first imaging element 21. An element for emitting the coherent La input from the coherent beam source 12 with a predetermined diffusion angle as a collimated beam is ideal as the first imaging element 21.

A size including the number of gratings which is sufficient for the diffraction grating 11T generating a diffracted beam is desirable as the beam diameter of the coherent beam La collimated at the first imaging element 21. Also, a size which is not influenced by dust or scratches on the grating plane 11a is desirable as the beam diameter thereof. Further, the beam diameter thereof can be adjusted by changing the numeric aperture or the like of the first imaging element 21, and it is desirable, for example, that the beam diameter thereof is set to several hundred μm or more.

The coherent beam La emitted from the coherent beam source 12 and collimated at the first imaging element 21 is input to the polarization beam splitter 22. The polarization beam splitter 22 reflects a portion of the input coherent beam La to generate a coherent beam La1, and transmits the remaining portion of the input coherent beam La to generate a coherent beam La2.

Also, the two-time diffracted beams Lc1 and Lc2 from the diffraction grating 11T are input to the polarization beam splitter 22. The polarization beam splitter 22 causes the two two-time diffracted beams Lc1 and Lc2 to overlap and interfere with each other, and irradiates the interference beam Ld thus obtained on each of the light receiving elements 134a, 134b, 134c, and 134d.

The reflector 23 reflects the coherent beam La1 reflected off the polarization beam splitter 22 to irradiate this on a predetermined position of the grating plane 11a of the diffraction grating 11T. Also, the reflector 24 reflects the coherent beam La2 transmitted from the polarization beam splitter 22 to irradiate this on a predetermined position of the grating plane 11a of the diffraction grating 11T. The reflectors 23 and 24 irradiate the coherent beams La1 and La2 divided by the polarization beam splitter 22 on the same position of the grating plane 11a, respectively.

Also, the two-time diffracted beam Lc1 generated by the one-time diffracted beam Lb1 being irradiated on the diffraction grating 11T is irradiated on the reflector 23. The reflector 23 reflects this two-time diffracted beam Lc1 to irradiate this on the polarization beam splitter 22. Similarly, the two-time diffracted beam Lc2 generated by the one-time diffracted beam Lb2 being irradiated on the diffraction grating 11T is irradiated on the reflector 24. The reflector 24 reflects this two-time diffracted beam Lc2 to irradiate this on the polarization beam splitter 22. The two-time diffracted beams Lc1 and Lc2 generated from the same position on the grating plane 11a are irradiated on the reflectors 23 and 24.

The second imaging element 25 is made up of an optical element such as a lens including a predetermined numeric aperture, or the like. The interference beam Ld wherein the two two-time diffracted beam Lc1 and Lc2 are overlapped by the polarization beam splitter 22 is input to the second imaging element 25.

The second imaging element 25 images the overlapped interference beam Ld on the light receiving faces of the respective light receiving elements 134a, 134b, 134c, and 134d with a predetermined beam diameter. The imaged point thereof does not necessarily have to be set to a point where the beam diameter becomes the minimum, and may be set to a point where the difference between the optical path lengths within a beam image becomes the minimum.

The reflecting optical system 16 includes a reflector 26 which reflects the one-time diffracted beam Lb1 generated by the coherent beam La1 being diffracted at the diffraction grating 11T to irradiate this on the diffraction grating 11T again, a third imaging element 27 which irradiates the one-time diffracted beam Lb1 reflected off the reflector 26 on the diffraction grating 11T as a collimated beam, and a quarter-wave plate 28 for converting the polarized state of the one-time diffracted beam Lb1.

The reflecting optical system 17 includes a reflector 29 which reflects the one-time diffracted beam Lb2 generated by the coherent beam La1 being diffracted at the diffraction grating 11T to irradiate this on the diffraction grating 11T again, a fourth imaging element 30 which irradiates the one-time diffracted beam Lb2 reflected off the reflector 29 on the diffraction grating 11T as a collimated beam, and a quarter-wave plate 31 for converting the polarized state of the one-time diffracted beam Lb2.

The one-time diffracted beam Lb1 passed through the quarter-wave plate 28 is irradiated on the reflector 26 of the reflecting optical system 16. The reflector 26 reflects the one-time diffracted beam Lb1 perpendicularly such that the one-time diffracted beam Lb1 to be reflected returns the same route as the input route. The one-time diffracted beam Lb1 to be irradiated on the reflector 26 passes through the quarter-wave plate 28, and also the one-time diffracted beam Lb1 to be reflected off the reflector 26 passes through the quarter-wave plate 28 again, and accordingly, the one-time diffracted beam Lb1 is irradiated on the diffraction grating 11T in a state in which the polarization direction is converted by 90°.

The third imaging element 27 of the reflecting optical system 16 is made up of an optical element such as a lens having a predetermined numeric aperture, and with the focal length on the diffraction grating 11T side as F1, and with the focal length on the reflector 26 side as F2, the diffraction grating 11T is disposed on around one of the focal positions of the third imaging element 27, and the reflector 26 is disposed on around the other of the focal positions of the third imaging element 27. Here, the focal lengths of the third imaging element 27 are F1=F2.

The one-time diffracted beam Lb2 passed through the quarter-wave plate 31 is irradiated on the reflector 29 of the reflecting optical system 17. The reflector 29 reflects the one-time diffracted beam Lb2 perpendicularly such that the one-time diffracted beam Lb2 to be reflected returns the same route as the input route. The one-time diffracted beam Lb2 to be irradiated on the reflector 29 passes through the quarter-wave plate 31, and also the one-time diffracted beam Lb2 to be reflected off the reflector 29 passes through the quarter-wave plate 31 again, and accordingly, the one-time diffracted beam Lb2 is irradiated on the diffraction grating 11T in a state in which the polarization direction is converted by 90°.

The fourth imaging element 30 of the reflecting optical system 17 is made up of an optical element such as a lens including a predetermined numeric aperture, and with the focal length on the diffraction grating 11T side as F3, and with the focal length on the reflector 29 side as F4, the diffraction grating 11T is disposed on around one of the focal positions of the fourth imaging element 30, and the reflector 29 is disposed on around the other of the focal positions of the fourth imaging element 30. Here, the focal lengths of the fourth imaging element 30 are F3=F4, and also the focal length of the third imaging element 27 and the focal length of the fourth imaging element 30 are configured equally.

Such reflecting optical systems 16 and 17 reflect the one-time diffracted beams Lb1 and Lb2 generated by the coherent beams La1 and La1 being diffracted by the diffraction grating 11T to irradiate these on the diffraction grating 11T again. The one-time diffracted beams Lb1 and Lb2 irradiated at the diffraction grating 11T again are diffracted at the diffraction grating 11T.

The two-time diffracted beams Lc1 and Lc2 by the one-time diffracted beams Lb1 and Lb2 being diffracted by the diffraction grating 11T return on the same optical path as the coherent beams La1 and La2, and are irradiated on the polarization beam splitter 22.

Figure 3:
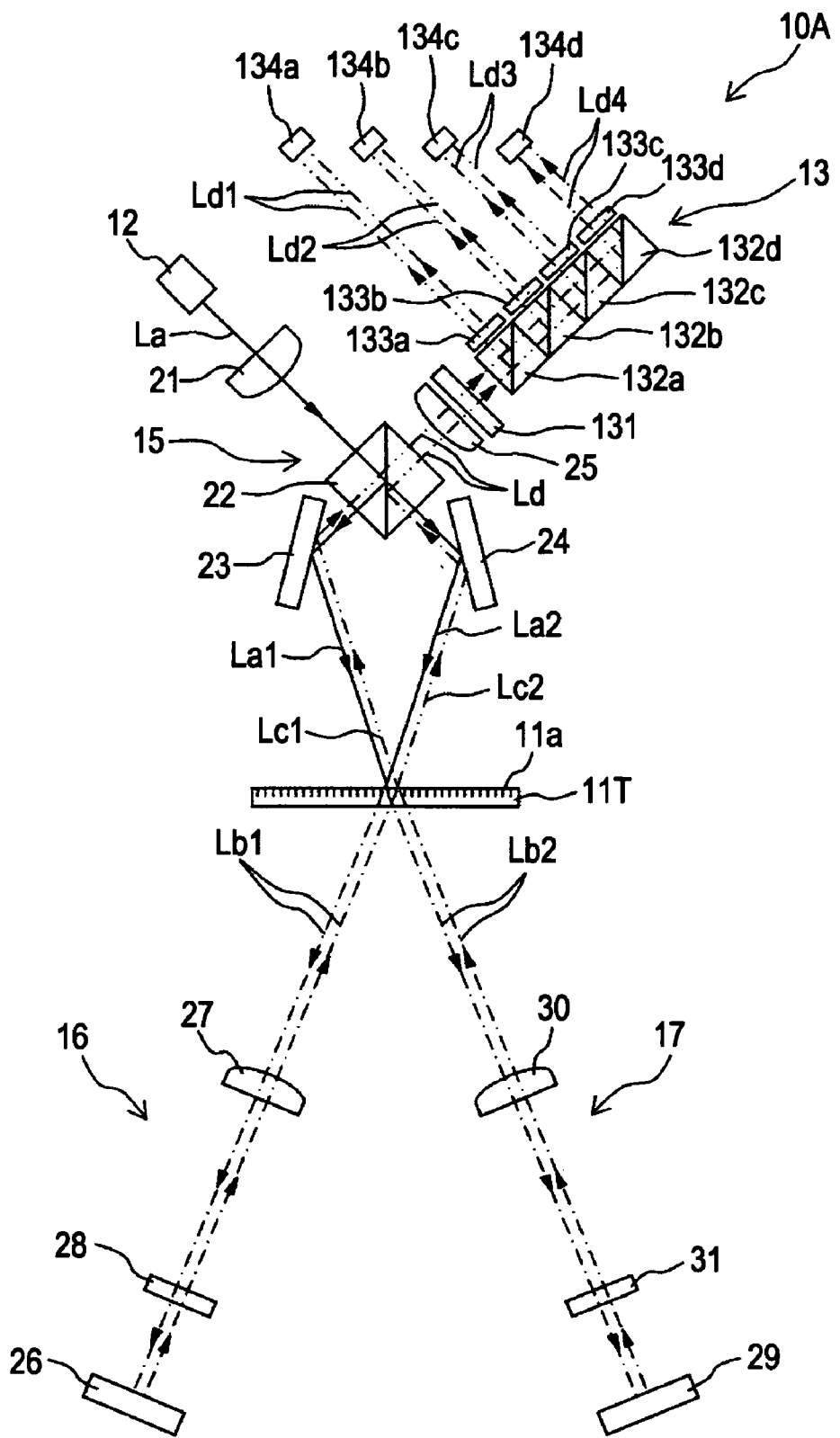
FIG. 3 is an explanatory diagram illustrating the optical paths of coherent beams and diffracted beams within the optical displacement measuring device according to the first embodiment of the present invention.

FIG. 3 is an explanatory diagram illustrating the optical paths of coherent beams and diffracted beams within the optical displacement measuring device according to the first embodiment of the present invention. The optical path order of the coherent beams La1 and La2, one-time diffracted beams Lb1 and Lb2, and two two-time diffracted beams Lc1 and Lc2 are shown in FIG. 3, and the optical path of each optical beam will be described. Note that the optical paths shown in FIG. 3 are schematic paths, and accordingly, the optical axis of each optical beam is not restricted to these.

The coherent beam La emitted from the coherent beam source 12 is collimated through the first imaging element 21, and is divided into two coherent beams La1 and La2 which are S polarized beam and P polarized beam by the polarization beam splitter 22.

The one coherent beam La1 reflected at the polarization beam splitter 22 is an S polarized beam, is reflected at the reflector 23, and is irradiated on a predetermined point P on the grating plane 11*a* of the diffraction grating 11T. Subsequently, the one coherent beam La1 irradiated on this predetermined point P is diffracted, and a one-time diffracted beam Lb1 passed through the diffraction grating 11T is generated. This one-time diffracted beam Lb1 is generated from this predetermined point P.

The one-time diffracted beam Lb1 generated at the diffraction grating 11T is condensed through the third imaging element 27 of the reflecting optical system 16, and is imaged on the reflector 26 through the quarter-wave plate 28. The one-time diffracted beam Lb1 imaged on the reflector 26 is reflected perpendicularly as to the reflecting face by the reflector 26, passes through the quarter-wave plate 28 again, collimated at the third imaging element 27, and is irradiated on the predetermined point P on the grating plane 11*a* of the diffraction grating 11T.

Subsequently, the one-time diffracted beam Lb1 irradiated on the predetermined point P is diffracted, and a two-time diffracted beam Lc1 which transmitted through the diffraction grating 11T is generated. This two-time diffracted beam Lc1 returns on the same optical path as the coherent beam La1, and inputs to the polarization beam splitter 22.

The other coherent beam La2 which transmitted through the polarization beam splitter 22 is a P polarized beam, and is reflected off the reflector 24, and is irradiated on the same predetermined point P as the irradiated position of the one coherent beam La1. Subsequently, the other coherent beam La2 irradiated on the predetermined point P is diffracted, and a one-time diffracted beam Lb2 which transmitted through the diffraction grating 11T is generated. This one-time diffracted beam Lb2 is generated from this predetermined point P.

The one-time diffracted beam Lb2 generated at the diffraction grating 11T is condensed through the fourth imaging element 30 of the reflecting optical system 17, and is imaged on the reflector 29 through the quarter-wave plate 31. The one-time diffracted beam Lb2 imaged on the reflector 29 is reflected perpendicularly as to the reflecting face by the reflector 29, passes through the quarter-wave plate 31 again, is collimated at the fourth imaging element 30, and is irradiated on the predetermined point P on the grating plane 11a of the diffraction grating 11T.

Subsequently, the one-time diffracted beam Lb2 irradiated on the predetermined point P is diffracted, and a two-time diffracted beam Lc2, which transmitted through the diffraction grating 11T, is generated. This two-time diffracted beam Lc2 returns on the same optical path as the coherent beam La2, and inputs to the polarization beam splitter 22.

The two-time diffracted beam Lc1 generated by diffracting the one coherent beam La1 reflected at the polarization beam splitter 22 at the diffraction grating 11T passes through the quarter-wave plate 28 at the reflecting optical system 16 in a reciprocated manner, whereby the polarization direction is converted 90°. Thus, the two-time diffracted beam Lc1 input to the polarization beam splitter 22 is a P polarized beam, and is transmitted through the polarization beam splitter 22.

On the other hand, the two-time diffracted beam Lc2 generated by diffracting the other coherent beam La2 which has been transmitted through the polarization beam splitter 22 at the diffraction grating 11T passes through the quarter-wave plate 31 at the reflecting optical system 17 in a reciprocated manner, whereby the polarization direction is converted 90°. Thus, the two-time diffracted beam Lc2 input to the polarization beam splitter 22 is an S polarized beam, and reflects off the polarization beam splitter 22.

Accordingly, the two two-time diffracted beams Lc1 and Lc2 input to the polarization beam splitter 22 are overlapped by the polarization beam splitter 22 to interfere with each other. The interference beam Ld wherein the two two-time diffracted beams Lc1 and Lc2 interfere with each other is condensed through the second imaging element 25, and is input to the light receiving unit 13.

The interference beam Ld input to the light receiving unit 13 passes through the quarter-wave plate 131, whereby the polarized state is converted. The two two-time diffracted beams Lc1 and Lc2 overlapped at the polarization beam splitter 22 are converted into circular polarized beams in an opposite direction mutually.

The interference beam Ld of which the polarized state is converted through the quarter-wave plate 131 is input to the beam splitter 132a. With the interference beam Ld input to the beam splitter 132a, a portion thereof is reflected according to the reflectance of the beam splitter 132a, and the remainder thereof transmits through the beam splitter 132a to input to the beam splitter 132b.

With the coherent beam Ld input to the beam splitter 132b, a portion thereof is reflected according to the reflectance of the beam splitter 132b, and the remainder thereof transmits through the beam splitter 132b to input to the beam splitter 132c. With the coherent beam Ld input to the beam splitter 132c, a portion thereof is reflected according to the reflectance of the beam splitter 132c, and the remainder thereof transmits through the beam splitter 132c to input to the beam splitter 132d. The coherent beam Ld input to the beam splitter 132d is reflected totally.

With the coherent beam Ld1 reflected off the beam splitter 132a, only the polarization components of 0° transmit through the polarizer 133a and are imaged on the light receiving element 134a. With the coherent beam Ld2 reflected off the beam splitter 132b, only the polarization components of 45° transmit through the polarizer 133b, and are imaged on the light receiving element 134b. With the coherent beam Ld3 reflected off the beam splitter 132c, only the polarization components of 90° transmit through the polarizer 133c, and are imaged on the light receiving element 134c. With the coherent beam Ld4 reflected off the beam splitter 132d, only the polarization components of 135° transmit through the polarizer 133d, and are imaged on the light receiving element 134d.

With the optical displacement measuring device 10A thus configured, the diffraction grating 11T is moved in the grating vector direction according to movement of the movable portion, thereby generating a phase difference between the two two-time diffracted beams Lc1 and Lc2. The optical displacement measuring device 10A causes these two two-time diffracted beams Lc1 and Lc2 to interfere with each other to detect an interference signal and obtains the phase difference between the two-time diffracted beams Lc1 and Lc2 from this interference signal to detect the movement position of the diffraction grating 11T.

Specifically, assuming that the intensities of the two two-time diffracted beams Lc1 and Lc2 to be overlapped at the polarization beam splitter 22 are $A_1$ and $A_2$ respectively, the movement quantity in the grating vector direction of the diffraction grating 11T is x, and the initial phase is δ, the intensity I of an interference signal such as the following Expression (1) is obtained.

$$I = A_1^2 + A_2^2 + 2 \cdot A_1 \cdot A_2 \cos(4 \cdot K \cdot x + \delta). \tag{1}$$

$K = 2\pi/\Lambda$ (where $\Lambda$ is a grating pitch)

The intensity I of the interference signal is changed one cycle worth by the diffraction grating 11T moving $\Lambda/4$ in the grating vector direction. δ is quantity depending on the optical length difference between the two two-time diffracted beams Lc1 and Lc2 to be overlapped.

The intensities of the coherent beams Ld1, Ld2, Ld3, and Ld4, which transmitted through the respective polarizers 133a, 133b, 133c, and 133d, are represented with the following Expressions (2) through (5), respectively.

$$B + A \cos(4 \cdot K \cdot x + \delta) \tag{2}$$

$$B + A \cos(4 \cdot K \cdot x + 90° + \delta). \tag{3}$$

$$B + A \cos(4 \cdot K \cdot x + 180° + \delta). \tag{4}$$

$$B + A \cos(4 \cdot K \cdot x + 270° + \delta). \tag{5}$$

Here,
$B = \frac{1}{4}(A_1^2 + A_2^2)$, and
$A = (\frac{1}{2}) \cdot A_1 \cdot A_2$
hold.

Expression (2) represents the intensity of the coherent beam Ld1 which transmitted through the polarizer 133a, Expression (3) represents the intensity of the coherent beam Ld2 which transmitted through the polarizer 133b, Expression (4) represents the intensity of the coherent beam Ld3 which transmitted through the polarizer 133c, and Expression (5) represents the intensity of the coherent beam Ld4 which transmitted through the polarizer 133d.

With the respective light receiving elements 134a, 134b, 134c, and 134d, the coherent beams of the intensities represented with the above-mentioned Expressions are subjected to photoelectric conversion, thereby generating interference signals.

Now, upon subtracting between Expression (2) and Expression (4), the DC components of an interference signal can be removed. Also, upon subtracting between Expression (3) and Expression (5), the DC components of an interference signal can be removed. Also, with the subtracted signals, the phases differ 90° mutually, so signals for detecting the movement direction of the diffraction grating 11T can be obtained.

Figure 4:
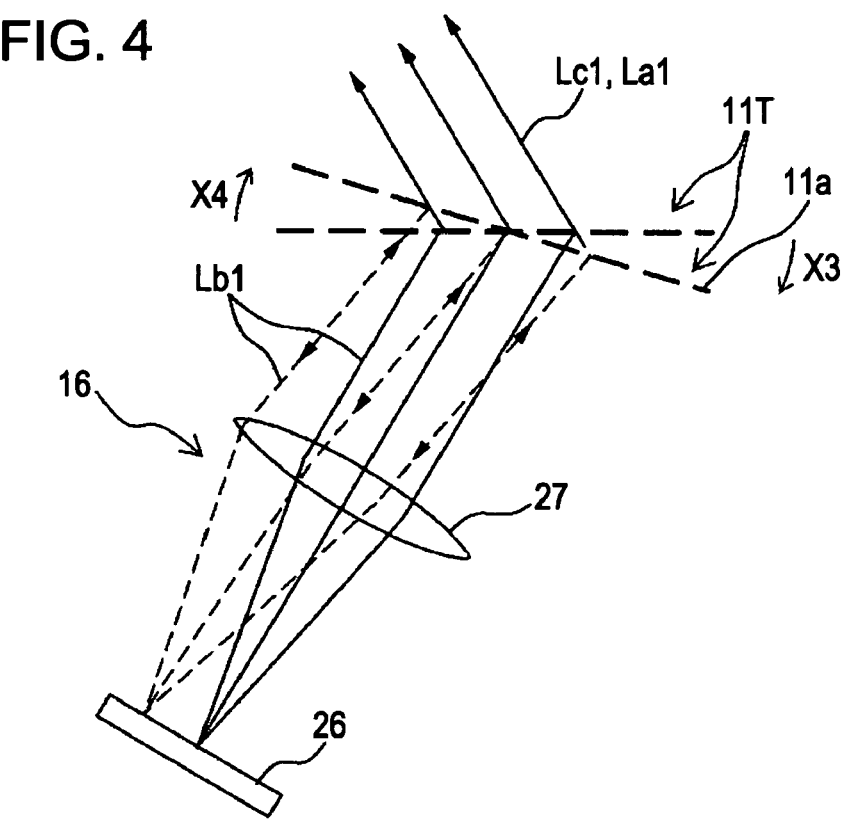
FIG. 4 is an operation explanatory diagram illustrating the relations between the displacement of the diffraction grating and optical paths.
Figure 5:
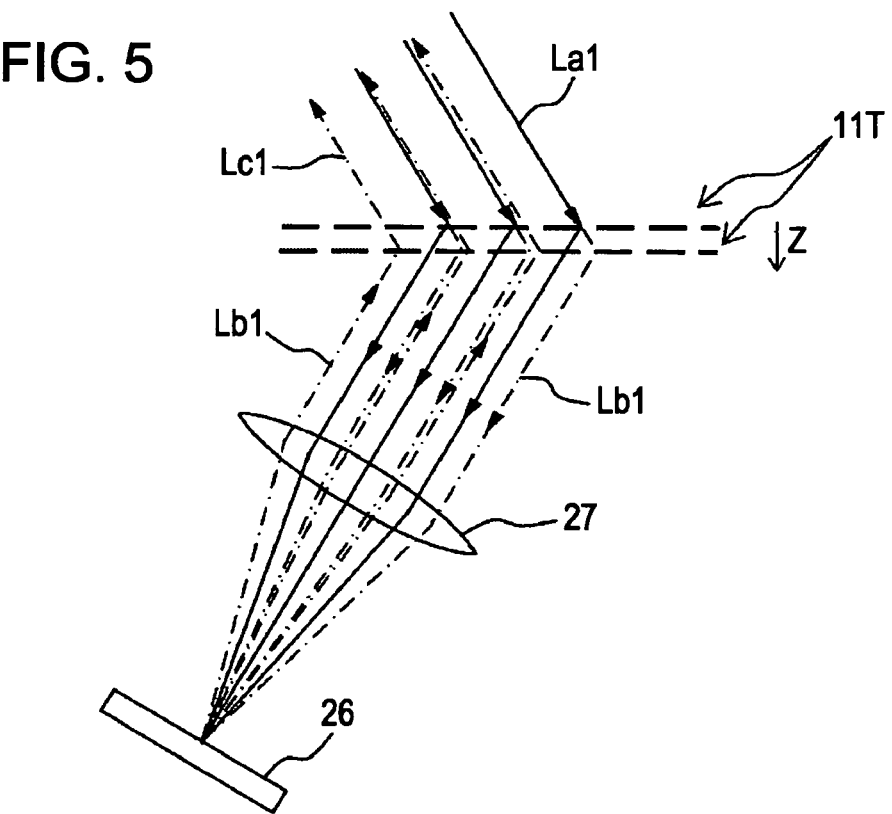
FIG. 5 is an operation explanatory diagram illustrating the relations between the displacement of the diffraction grating and optical paths.

FIGS. 4 and 5 are explanatory operation diagrams illustrating the relations between the displacement of the diffraction grating and optical paths. As shown in FIG. 4, we will say that one end in the grating vector direction of the diffraction grating 11T moves in a one direction which is a normal vector direction (e.g., arrow X3 direction in FIG. 4), and the other end moves in the opposite direction which is a normal vector direction (e.g., arrow X4 direction in FIG. 4), and accordingly, the grating plane 11a is inclined. In this case, the diffraction angles of the one-time diffracted beams Lb1 and Lb2 are changed.

FIG. 4 illustrates the optical paths at the reflecting optical system 16, wherein upon the grating plane 11a being inclined, and the diffraction angles of the one-time diffracted beams Lb1 and Lb2 being changed, the optical axes of the one-time diffracted beams Lb1 and Lb2 at the time of passing through the reflecting optical system 16 are changed. For example, as shown in dashed lines in FIG. 4, the optical paths of the one-time diffracted beams Lb1 and Lb2 are changed. Note that with the reflecting optical system 17 as well, the optical paths thereof become the same optical paths.

With the optical displacement measuring device 10A according to the first embodiment of the present invention, the coherent beam La emitted from the coherent beam source 12 is collimated at the first imaging element 21, and the collimated beam is irradiated on the grating plane 11a of the diffraction grating 11T.

Also, the reflector 26 is disposed around the focal position of the third imaging element 27, the third imaging element 27 images the one-time diffracted beam Lb1 on the reflector 26 to irradiate constantly perpendicularly and also collimates the one-time diffracted beam Lb1 reflected off the reflector 26 to irradiate the collimated beam on the diffraction grating 11T.

Further, as shown in FIG. 1, the focal length F1 on the diffraction grating 11T side of the third imaging element 27, and the focal length F2 on the reflector 26 side of the third imaging element 27 are configured generally in the same way.

Similarly, the reflector 29 is disposed around the focal position of the fourth imaging element 30, the fourth imaging element 30 images the one-time diffracted beam Lb2 on the reflector 29 to irradiate constantly perpendicularly, and also collimates the one-time diffracted beam Lb2 reflected off the reflector 29 to irradiate the collimated beam on the diffraction grating 11T.

Also, as shown in FIG. 1, the focal length F3 on the diffraction grating 11T side of the fourth imaging element 30, and the focal length F4 on the reflector 29 side of the fourth imaging element 30 are configured generally in the same way.

Therefore, the one-time diffracted beams Lb1 and Lb2 reflected off the reflectors 26 and 29 will return, even in a case where the diffraction grating 11T is inclined, and consequently the optical axes are shifted, on the same optical path as the optical path at the time of input, and input to the same input point on the grating plane 11a of the diffraction grating 11T, respectively. Accordingly, with the optical displacement measuring device 10A, two-time diffracted beams Lc1 and Lc2 generated by the one-time diffracted beams Lb1 and Lb2 will pass through, even in a case where the diffraction grating 11T is inclined, the same optical path. Also, there is no change in the optical path lengths.

On the other hand, as shown in FIG. 5, even in a case where the diffraction grating 11T is shifted parallel to the Z direction, the two-time diffracted beams Lc1 and Lc2 are collimated beams, and between the coherent beam La1 and two-time diffracted beam Lc1, and between the coherent beam La2 and two-time diffracted beam Lc2 keep generally collimated optical paths. Also, there is no change in the optical path lengths.

Thus, with the optical displacement measuring device 10A according to the first embodiment of the present invention, the two two-timed diffracted beams Lc1 and Lc2 are overlapped at the polarization beam splitter 22 without being shifted mutually. Therefore, in a case where the diffraction grating 11T moves other than directions parallel to the grating vectors, for example, as shown in FIG. 4, even in a case where the diffraction grating 11T is inclined, or the diffraction grating 11T includes an undulation or the like though not shown in the drawing, interference signals detected by the light receiving elements 134a, 134b, 134c, and 134d do not deteriorate.

Also, as shown in FIG. 5, even in a case where the diffraction grating 11T is shifted parallel to the Z direction, interference signals detected by the light receiving elements 134a, 134b, 134c, and 134d do not deteriorate. Accordingly, with the optical displacement measuring device 10A according to the first embodiment, the movement position of the moving movable portion can be detected with high resolution and high precision. Also, with the optical displacement measuring device 10A, the flexibility of the attachment position to the movable portion such as a tooling machine or the like increases, and also even in a case where this movable portion is subjected to vibration or blurring or the like, the position can be detected in a stable manner.

Further, with the optical displacement measuring device 10A, the interference beam Ld wherein the two-time diffracted beams Lc1 and Lc2 are overlapped at the polarization beam splitter 22, is imaged on the light receiving face by employing the second imaging element 25, thereby preventing the vignetting of a beam on the light receiving face.

Note that with a configuration wherein the interference beam Ld is divided into four by the beam splitters 132a, 132b, 132c, and 132d which are disposed in a line, the distance from the respective beam splitters to the focal position of the second imaging element 25 differs depending on the distance between the second imaging element 25 and the respective beam splitters.

Therefore, with a configuration wherein the interference beams Ld1, Ld2, Ld3, and Ld4 divided into four at the beam splitters 132a, 132b, 132c, and 132d are connected to the light receiving elements 134a, 134b, 134c, and 134d, the light receiving face position of each light receiving element is disposed by being shifted in accordance with the distance from each beam splitter to the focal position of the second imaging element 25. Thus, the vignetting of a beam can be prevented from occurring on the light receiving face of each of the light receiving elements 134a, 134b, 134c, and 134d.

Also, with the optical displacement measuring device 10A, the optical length between the coherent beam La1 and the two-time diffracted beam Lc1, and the optical length between the coherent beam La2 and the two-time diffracted beam Lc2 are set equally, and the optical length of the one-time diffracted beam Lb1 and the optical length of the one-time diffracted beam Lb2 are set equally, thereby preventing a measurement error due to variations of wavelength from occurring.

Therefore, with the optical displacement measuring device 10A, in order to adjust each optical path length, there may be employing a coherent beam source 12 for emitting a coherent beam La having coherence capable of detecting the difference between optical lengths as change in the modulation factor of an interference pattern. For example, if a multi-mode semiconductor laser of which the coherent distance is short such as around several hundred µm is employed as the coherent beam source 12, the position of the polarization beam splitter 22 is adjusted such that the modulation factor of an interference pattern becomes the maximum, whereby the differences of the respective optical path lengths can be suppressed several ten µm or less.

Also, with the optical displacement measuring device 10A, the polarization beam splitter 22 is employed for division of a coherent beam La, and interference of two two-time diffracted beams Lc1 and Lc2, DC fluctuation due to influence such as the transmittance, reflectance, diffraction efficiency, and so forth of the diffraction grating 11T can be removed from an interference signal to be detected, and accordingly, the movement position of the moving movable portion can be detected with high resolution and high precision.

Figure 6:
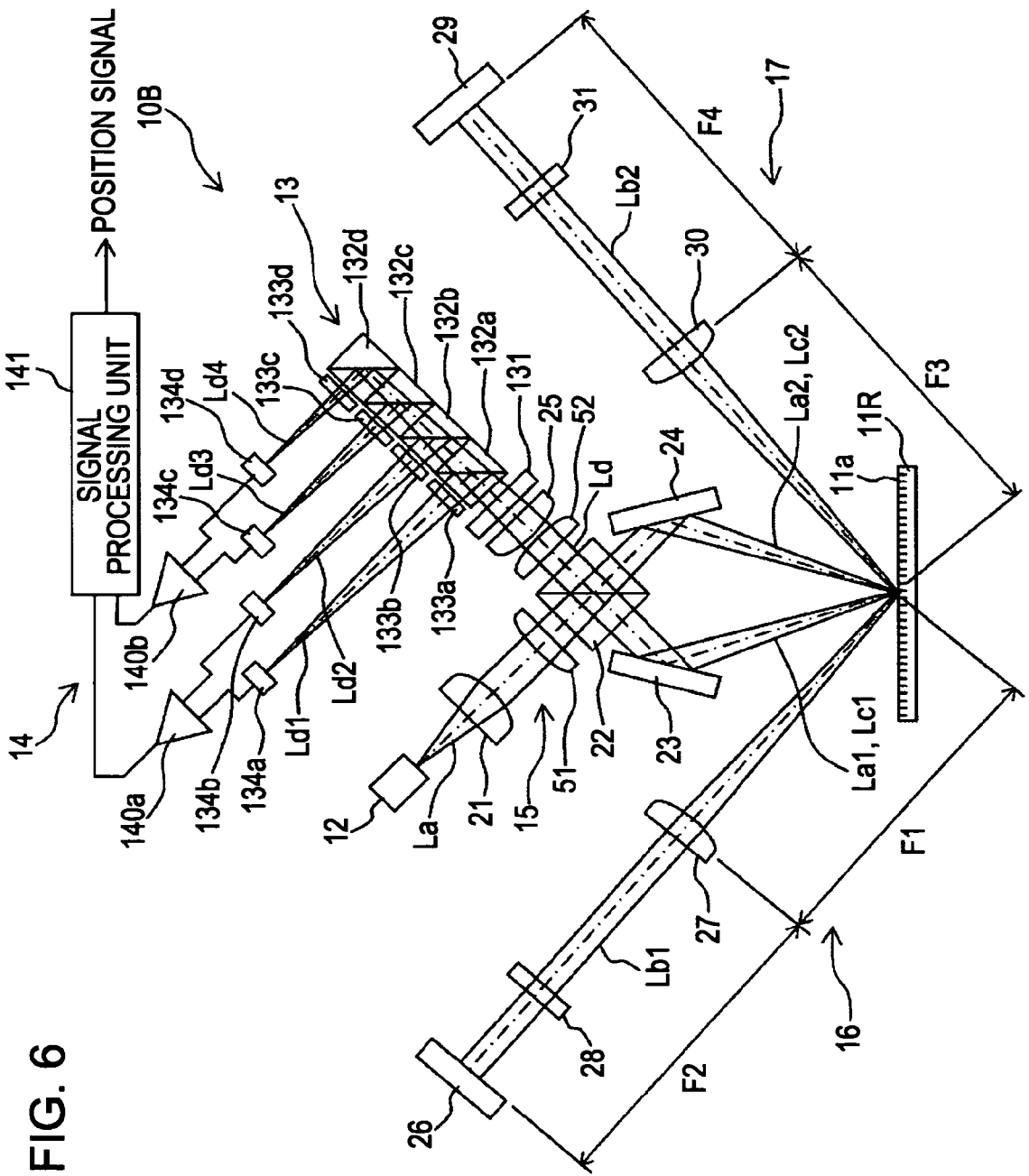
FIG. 6 is a configuration diagram illustrating an example of an optical displacement measuring device according to a second embodiment of the present invention.

Configuration example of the optical displacement measuring device according to the second embodiment FIG. 6 is a configuration diagram illustrating an example of an optical displacement measuring device according to a second embodiment of the present invention. Before describing the optical displacement measuring device according to the second embodiment, the same components as the optical displacement measuring device 10A according to the above-mentioned first embodiment are denoted with the same reference numerals in the drawing, and detailed description thereof will be omitted. Also, with regard to the third embodiment in FIG. 9 and thereafter as well, the same components as the embodiments so far are denoted with the same reference numerals in the drawing, and detailed description will be omitted.

An optical displacement measuring device 10B according to the second embodiment of the present invention includes a reflection-type diffraction grating 11R, a first astigmatism optical element 51 between the first imaging element 21 and polarization beam splitter 22, and a second astigmatism optical element 52 between the polarization beam splitter 22 and second imaging element 25.

The first astigmatism optical element 51 condenses, of the coherent beam La collimated at the first imaging element 21, one direction of the cross section, and transmits the other direction without condensing, and images the coherent beams La1 and La2 divided at the polarization beam splitter 22 on the grating plane 11a of the diffraction grating 11R.

Of the coherent beam Ld wherein two two-time diffracted beams Lc1 and Lc2 imaged on the grating plane 11a, diffracted at the diffraction grating 11R, and spread with a predetermined angle are overlapped at the polarization beam splitter 22, the second astigmatism optical element 52 condenses one direction of the cross section and transmits the other direction without condensing to collimate this.

Figure 7A:
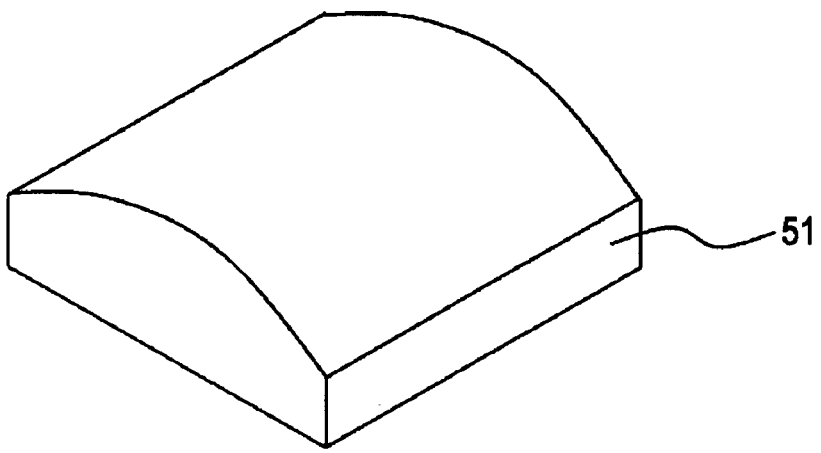
FIGS. 7A through 7C are perspective views illustrating an example of an astigmatism optical element.
Figure 7B:
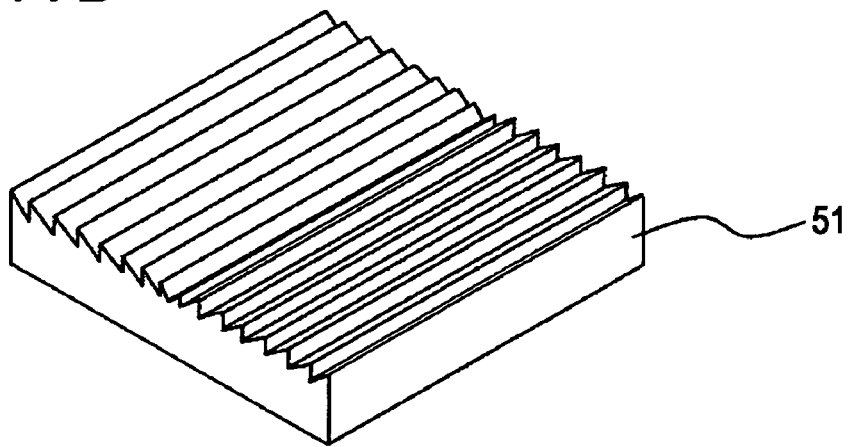
Figure 7C:
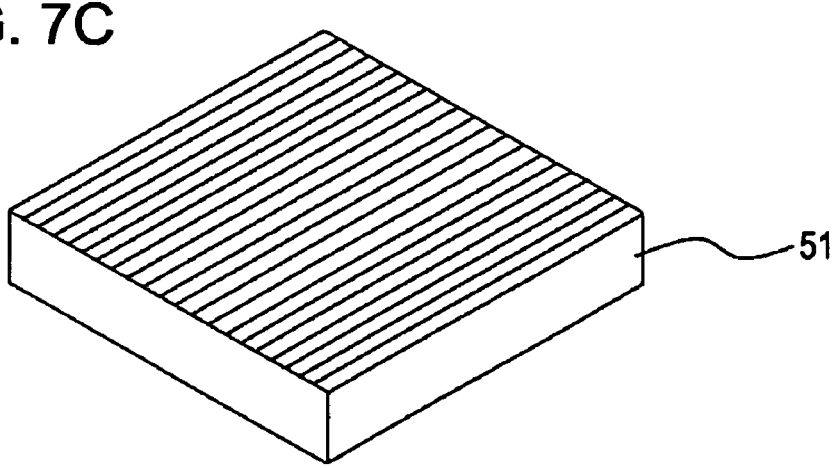

FIGS. 7A through 7C are perspective views illustrating an example of an astigmatism optical element. The first astigmatism 51 and the second astigmatism 52 are, for example, cylindrical lenses such as shown in FIG. 7A. Also, the first astigmatism 51 and the second astigmatism 52 may be Frensnel lenses shown in FIG. 7B or hologram lenses shown in FIG. 7C.

Figure 8A:
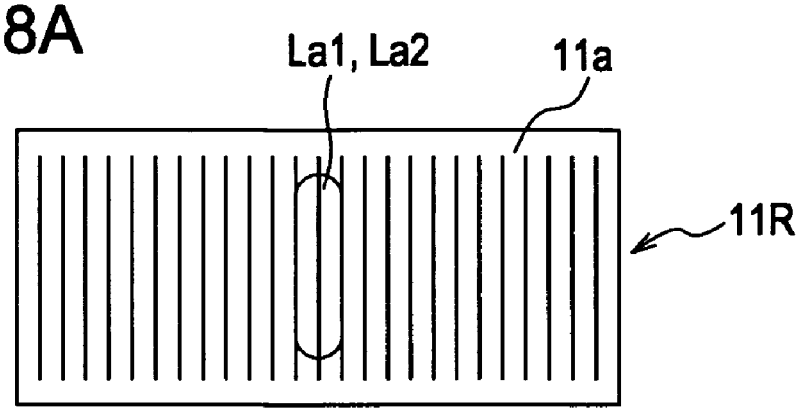
FIGS. 8A through 8C are explanatory diagrams illustrating an example of the astigmatism image shape of the optical displacement measuring device according to the second embodiment.
Figure 8B:
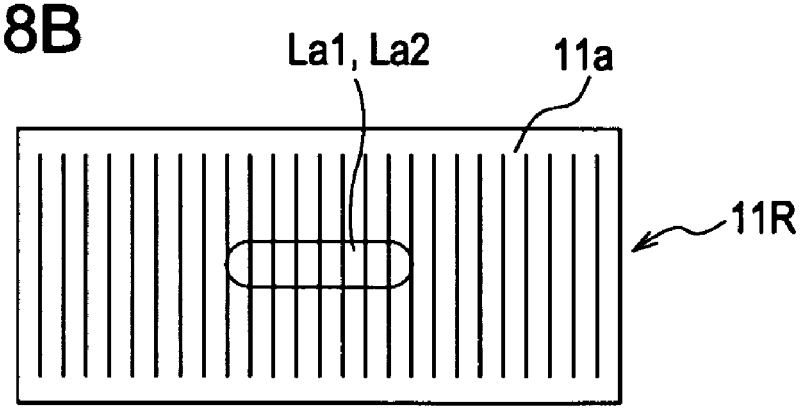
Figure 8C:
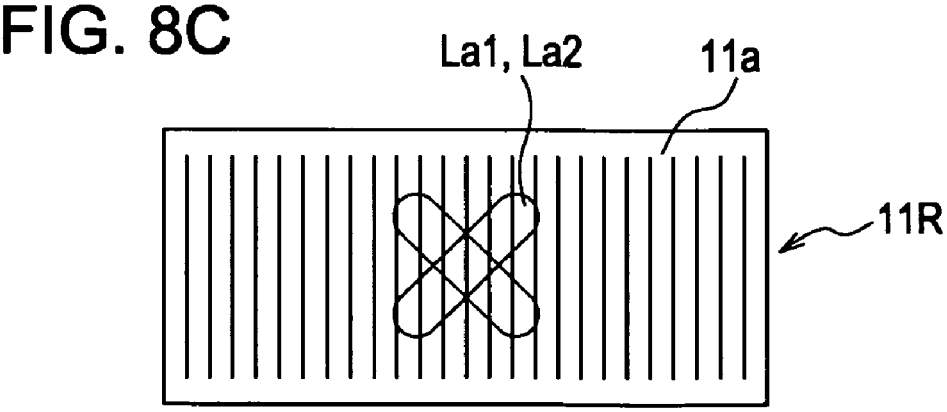

FIGS. 8A through 8C are explanatory diagrams illustrating an example of the astigmatism image shape of the optical displacement measuring device according to the second embodiment. The directions where the coherent beams La1 and La2 are imaged at the first astigmatism optical element 51 may be directions perpendicular to the grating vector D1 and D2 directions of the diffraction grating 11R, as shown in FIG. 8A. Also, the first astigmatism optical element 51 is rotated with the optical axis of the coherent beam La as the axis, and thus, as shown in FIG. 8B, the coherent beams La1 and La2 may be imaged parallel to the axes of the grating vector D1 and D2 directions of the diffraction grating 11R, or as shown in FIG. 8C, may be imaged with an arbitrary angle.

Next, description will be made regarding the operation effects of the optical displacement measuring device 10B according to the second embodiment of the present invention. Here, with regard to the direction where imaging is not performed at the first astigmatism optical element 51, the coherent beams La1 and La2 to be irradiated on the diffraction grating 11R are collimated beams. The operation effects in the case of irradiating a collimated beam on the diffraction grating 11R are the same as those described at the optical displacement measuring device 10A according to the first embodiment, so description thereof will be omitted here.

With the irradiated light receiving optical system 15, the focal length of the first astigmatism optical element 51 is matched with the focal lengths of the third imaging element 27 of the reflecting optical system 16 and the fourth imaging element 30 of the reflecting optical system 17, and the diffraction grating 11R is disposed around the focal position of the first astigmatism optical element 51.

With the coherent beams La1 and La2 to be irradiated on the diffraction grating 11R, the beam shapes in the direction where imaging is performed at the first astigmatism optical element 51 become ellipse images on the grating plane 11a of the diffraction grating 11R. Subsequently, the coherent beams La1 and La2 are diffracted at the diffraction grating 11R to generate one-time diffracted beams Lb1 and Lb2.

With the reflecting optical system 16 which forms the optical path of the one-time diffracted beam Lb1, the diffraction grating 11R is disposed around one of the focal positions of the third imaging element 27, and the reflector 26 is disposed around the other focal position of the third imaging element 27.

With the reflecting optical system 17 which forms the optical path of the one-time diffracted beam Lb2, the diffraction grating 11R is disposed around one of the focal positions of the fourth imaging element 30, and the reflector 29 is disposed around the other focal position of the fourth imaging element 30.

Thus, the one-time diffracted beams Lb1 and Lb2 diffracted at the diffraction grating 11R become beams collimated by the third imaging element 27 and fourth imaging element 30 and are input to the reflectors 26 and 29, respectively.

At this time the beam shapes on the reflecting plane of the reflectors 26 and 29 become ellipse images orthogonal to the image imaged on the grating plane 11a of the diffraction grating 11R, respectively. The one-time diffracted beams Lb1 and Lb2 reflected off the reflectors 26 and 29 pass through the third imaging element 27 and the fourth imaging element 30 again and are imaged on the diffraction grating 11R, thereby generating two-time diffracted beams Lc1 and Lc2 by the diffraction grating 11R, respectively. The beam images on the grating plane 11a of the diffraction grating 11R at this time become generally the same as the beam images by irradiation of the coherent beams La1 and La2.

The two-time diffracted beams Lc1 and Lc2 diffracted at the diffraction grating 11R are overlapped by the polarization beam splitter 22 and interfere with each other. The interference beam Ld where the two two-time diffracted beams Lc1 and Lc2 interfere with each other becomes a beam collimated by the second astigmatism optical element 52, is condensed at the second imaging element 25, and is imaged on the light receiving faces of the light receiving elements 134a, 134b, 134c, and 134d.

With the optical displacement measuring device 10B thus configured as well, the diffraction grating 11R is moved in the grating vector direction according to movement of the movable portion, thereby generating a phase difference between the two two-time diffracted beams Lc1 and Lc2. The optical displacement measuring device 10B causes these two two-time diffracted beams Lc1 and Lc2 to interfere with each other to detect an interference signal and obtains the phase difference between the two-time diffracted beams Lc1 and Lc2 from this interference signal to detect the movement position of the diffracted grating 11R.

With the optical displacement measuring device 10B according to the second embodiment of the present invention, in the same way as with the optical displacement measuring device 10A according to the first embodiment, in a case where the diffraction grating moves other than directions parallel to the grating vectors, for example, even in a case where the diffraction grating 11R is inclined, or the diffraction grating 11T has an undulation or the like, interference signals detected by the light receiving elements do not deteriorate.

Also, even in a case where the diffraction grating 11R is shifted parallel to the Z direction, interference signals detected by the light receiving elements do not deteriorate. Accordingly, with the optical displacement measuring device 10B as well, the movement position of the moving movable portion can be detected with high resolution and high precision. Also, with the optical displacement measuring device 10B as well, the flexibility of the attachment position to the movable portion such as a tooling machine or the like increases, and also even in a case where this movable portion is subjected to vibration or blurring or the like, the position can be detected in a stable manner.

Further, the beam diameter on the grating plane 11a of the diffraction grating 11R can be narrowed down to only a particular direction, for example, an ellipse-shaped beam parallel to the grating vectors D1 and D2, which are the measuring directions of the diffraction grating 11R, is employed, whereby the width of the diffraction grating 11R can be narrowed while reducing influence of deterioration in interference signals due to a foreign object on the diffraction grating 11R. Thus, reduction in costs for the diffraction grating to be attached to the movable portion serving as a measuring object, and reduction in mass can be achieved.

Figure 10:
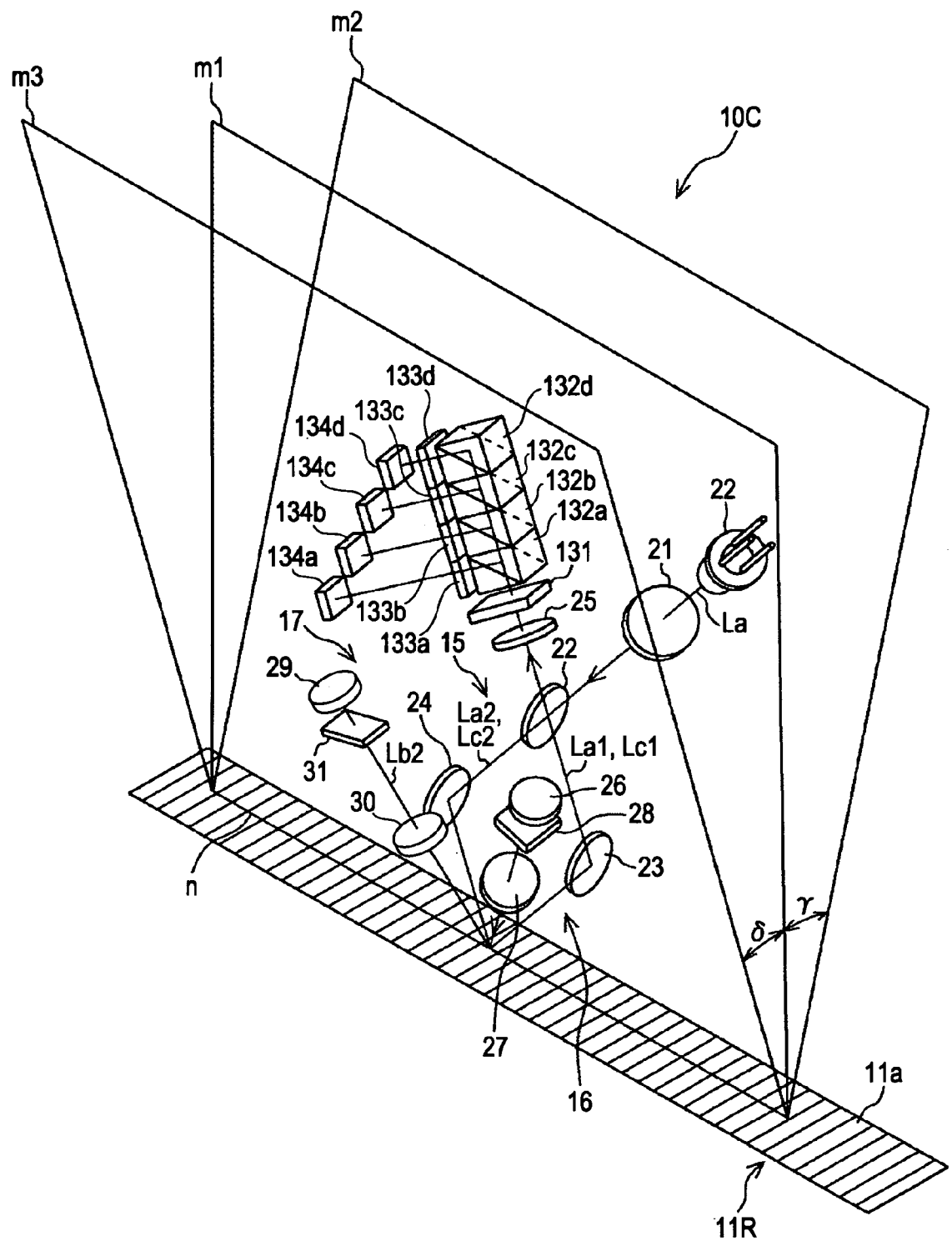
FIG. 10 is a schematic perspective view illustrating an example of the optical displacement measuring device according to the third embodiment.

Note that, with the second embodiment of the present invention, an arrangement has been made where the astigmatism optical elements 51 and 52 are provided in the optical displacement measuring device 10B to which the reflection-type diffraction grating 11R has been applied. But an arrangement may be made wherein the astigmatism optical elements are provided in an optical displacement measuring device 10A to which the transmission-type diffraction grating 11T has been applied. Configuration example of the optical displacement measuring device according to the third embodiment FIG. 9 is a configuration diagram illustrating an example of an optical displacement measuring device according to a third embodiment of the present invention, and FIG. 10 is a schematic perspective view illustrating an example of the optical displacement measuring device according to the third embodiment.

An optical displacement measuring device 10C according to the third embodiment of the present invention is a device including the reflection-type diffraction grating 11R, which performs detection of the movement of a movable portion such as a tooling machine or the like. Also, with the optical displacement measuring device 10C, an arrangement is made wherein a coherent beam is irradiated on the diffraction grating 11R from a direction other than a direction perpendicular to the grating plane 11a.

Now, let us say that one imaginary line parallel to the grating vector directions on the grating plane 11a of the diffraction grating 11R is taken as a line n, an imaginary plane parallel to the normal vector including the line n is taken as a reference plane m1, an imaginary plane including the line n wherein an angle made up of the reference plane m1 is $\gamma$ is taken as an inclined plane m2, an imaginary plane including the line n wherein an angle made up of the reference plane m1 is $\delta$ is taken as an inclined plane m3, and the inclined planes m2 and m3 are disposed on the same plane side as to the grating plane 11a of the diffraction grating 11R.

Figure 11:
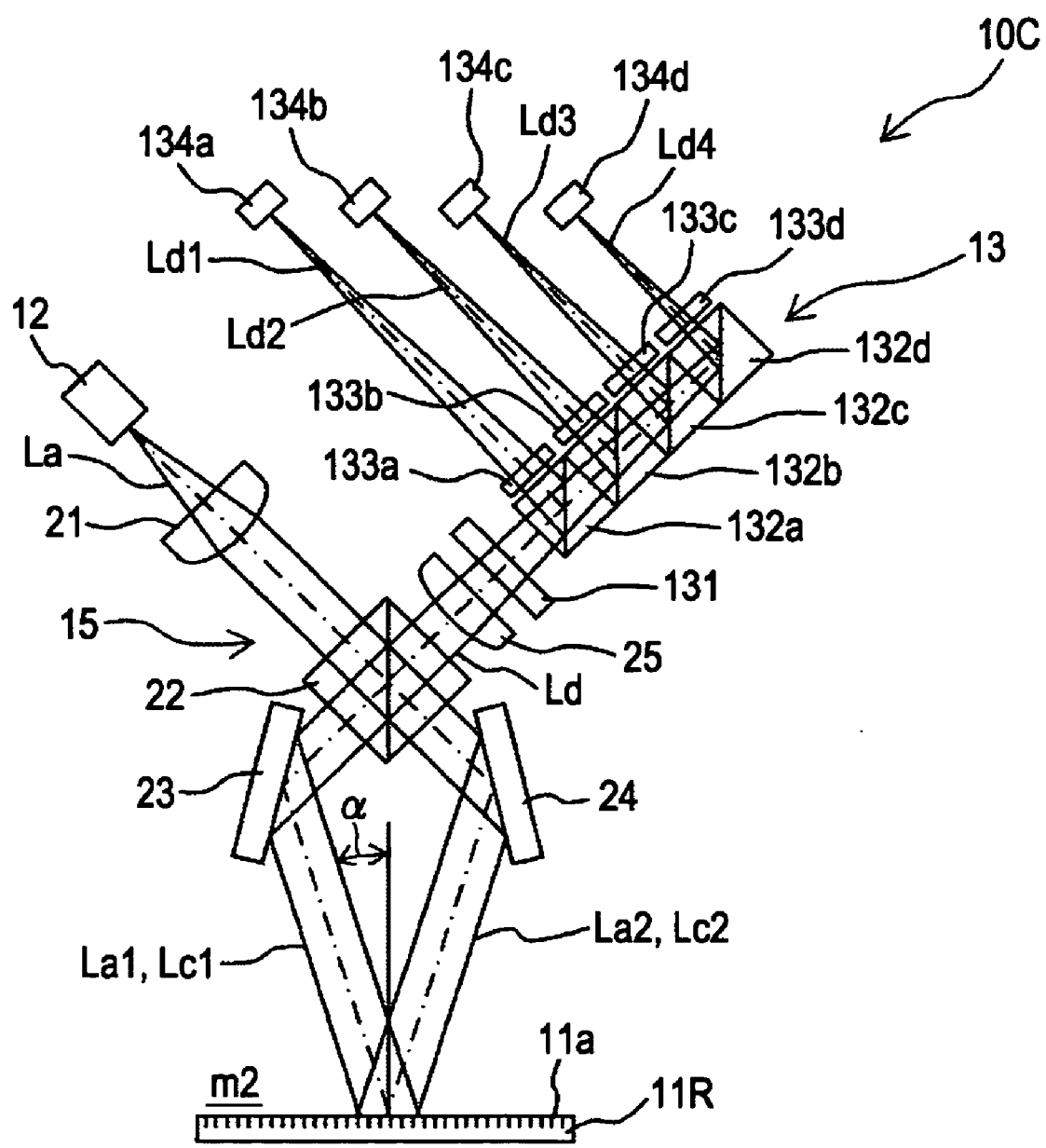
FIG. 11 is a side view illustrating components disposed on an inclined plane m2 as viewed from a direction perpendicular to the inclined plane m2.
Figure 12:
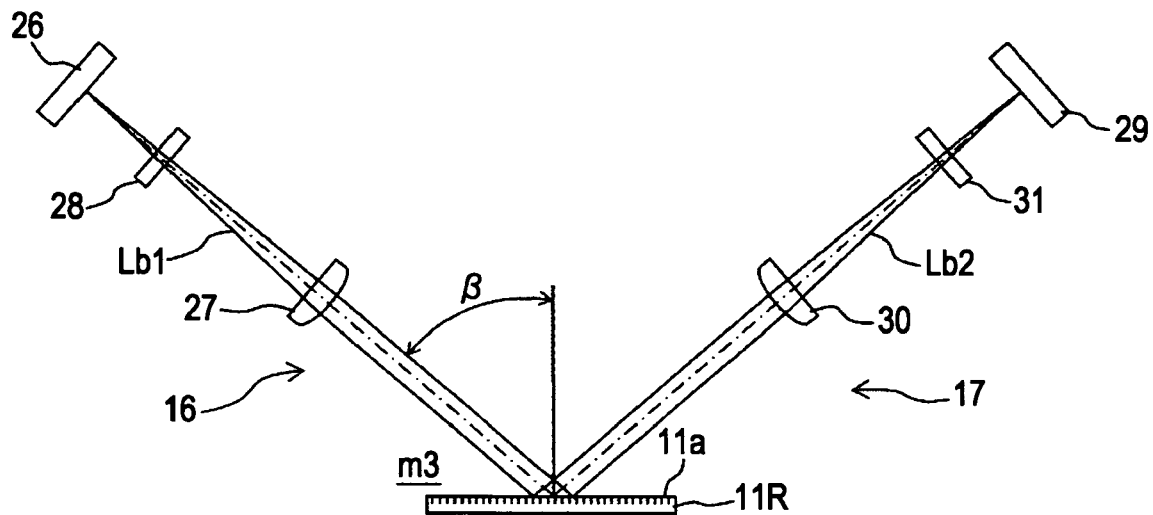
FIG. 12 is a side view illustrating components disposed on an inclined plane m3 as viewed from a direction perpendicular to the inclined plane m3.
Figure 13:
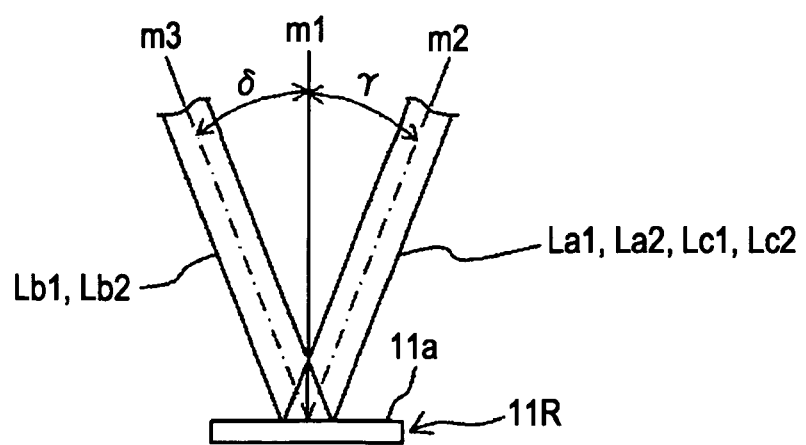
FIG. 13 is a front view of coherent beams input to a diffraction grating and diffracted beams diffracted by the diffraction grating.

FIG. 11 is a side view illustrating components disposed on the inclined plane m2 as viewed from a direction perpendicular to the inclined plane m2. FIG. 12 is a side view illustrating components disposed on the inclined plane m3 as viewed from a direction perpendicular to the inclined plane m3. FIG. 13 is a front view of coherent beams input to the diffraction grating, and diffracted beams diffracted by the diffraction grating as viewed from the grating vector directions.

With the optical displacement measuring device 10C according to the third embodiment in FIGS. 11 and 12, the coherent beam source 12, light receiving unit 13, and irradiated light receiving optical system 15 are disposed on the inclined plane m2. Also, with the optical displacement measuring device 10C, the reflecting optical systems 16 and 17 are disposed on the inclined plane m3.

The irradiated light receiving optical system 15 includes the first imaging element 21, polarization beam splitter 22, reflectors 23 and 24, and second imaging element 25. With the irradiated light receiving optical system 15, the respective components are disposed such that the coherent beam La emitted from the coherent beam source 12, the optical paths of the coherent beams La1 and La2 obtained by dividing the coherent beam La at the polarization beam splitter 22, and the optical paths of the two-time diffracted beams Lc1 and Lc2 diffracted at the diffraction grating 11R are formed on the inclined plane m2. Thus, with the coherent beams La1 and La2, and two-time diffracted beams Lc1 and Lc2, as shown in FIG. 13, the incident angle and diffraction angle as viewed from the grating vector directions become $\gamma$.

In FIG. 12, the reflecting optical system 16 includes the reflector 26, third imaging element 27, and quarter-wave plate 28, and the diffraction grating 11R is disposed around one of the focal positions of the third imaging element 27. Also, the reflector 26 is disposed around the other focal position of the third imaging element 27. With the present example, the focal length F1 on the diffraction grating 11R side of the third imaging element 27, and the focal length F2 on the reflector 26 side of the third imaging element 27 are configured generally in the same way.

In FIG. 12, the reflecting optical system 17 includes the reflector 29, fourth imaging element 30, and quarter-wave plate 31, and the diffraction grating 11R is disposed around one of the focal positions of the fourth imaging element 30. Also, the reflector 29 is disposed around the other focal position of the fourth imaging element 30. With the present example, the focal length F3 on the diffraction grating 11R side of the fourth imaging element 30, and the focal length F4 on the reflector 29 side of the fourth imaging element 30 are configured generally in the same way, and also the focal length of the third imaging element 27 and the focal length of the fourth imaging element 30 are configured generally in the same way.

With the reflecting optical system 16 in FIG. 12, the respective components are disposed such that the optical path of the one-time diffracted beam Lb1 diffracted at the diffraction grating 11R, and reflected off the reflector 26 to reciprocate is formed on the inclined plane m3. With the reflecting optical system 17, the respective components are disposed such that the optical path of the one-time diffracted beam Lb2 diffracted at the diffraction grating 11R, and reflected off the reflector 29 to reciprocate is formed on the inclined plane m3. Thus, with the one-time diffracted beams Lb1 and Lb2, as shown in FIG. 13, the incident angle and diffraction angle as viewed from the grating vector directions become δ.

The light receiving unit 13 includes a quarter-wave plate 131, beam splitters 132a, 132b, 132c, and 132d, polarizers 133a, 133b, 133c, and 133d, and light receiving elements 134a, 134b, 134c, and 134d. With the configuration including these components as the light receiving unit 13, the optical path of the coherent beam Ld wherein the two-time diffracted beams Lc1 and Lc2 are overlapped at the polarization beam splitter 22, is formed on the inclined plane m2, so at least the quarter-wave plate 131 and beam splitters 132a, 132b, 132c, and 132d are disposed on this optical path.

Next, description will be made regarding the operation effects of the optical displacement measuring device 10C according to the third embodiment. The coherent beam La emitted from the coherent beam source 12 is collimated at the first imaging element 21 and is input to the polarization beam splitter 22.

The polarization beam splitter 22 divides the input coherent beam La into two coherent beams La1 and La2 having a different polarization direction. The coherent beam La1 reflected off the polarization beam splitter 22 is an S polarized beam, and the coherent beam La2 transmitted through the polarization beam splitter 22 is a P polarized beam.

The reflector 23 reflects the coherent beam La1 reflected off the polarization beam splitter 22 to irradiate this on a predetermined position of the grating plane 11a of the diffraction grating 11R. The reflector 24 reflects the coherent beam La2 transmitted through the polarization beam splitter 22 to irradiate this on a predetermined position of the grating plane 11a of the diffraction grating 11R.

The reflectors 23 and 24 irradiate the coherent beams La1 and La2 on predetermined positions on the grating plane 11a such that the input angle on the inclined plane m2 becomes α, respectively. Note that the reflectors 23 and 24 are disposed such that the reflecting planes thereof face mutually. Therefore, with the coherent beams La1 and La2, the input directions thereof in the grating vector direction are mutually opposite directions.

The coherent beam La1 is diffracted by being irradiated on the diffraction grating 11R, whereby a one-time diffracted beam Lb1 is generated. The coherent beam La2 is diffracted by being irradiated on the diffraction grating 11R, whereby a one-time diffracted beam Lb2 is generated.

The diffraction angles of the one-time diffracted beams Lb1 and Lb2 are δ as shown in FIG. 13 in the case of viewing from the grating vector direction. That is to say, the one-time diffracted beams Lb1 and Lb2 are generated along the inclined plane m3. Also, the diffraction angles on the inclined plane m3 of the one-time diffracted beams Lb1 and Lb2 are β as shown in FIG. 12. Note that, with the one-time diffracted beams Lb1 and Lb2, the emission directions thereof in the grating vector direction are mutually opposite directions.

With the reflecting optical systems 16 and 17, as described above, the diffraction angles of the two one-time diffracted beams Lb1 and Lb2 are δ, as viewed in the grating vector directions, so the respective components are disposed such that the optical paths of the passing one-time diffracted beams Lb1 and Lb2 are formed on the inclined plane m3. Also, the reflectors 26 and 29 of the reflecting optical systems 16 and 17 are disposed at an angle whereby the one-time diffracted beams Lb1 and Lb2 diffracted at the diffraction angle β on the inclined plane m3 can be reflected perpendicularly.

The reflector 26 is disposed on the focal position of the third imaging element 27, whereby the one-time diffracted beam Lb1 is imaged on the reflector 26 through the third imaging element 27. Also, the one-time diffracted beam Lb1 reflected off the reflector 26 is collimated at the third imaging element 27, and is irradiated on the diffraction grating 11R.

The reflector 29 is disposed on the focal position of the fourth imaging element 30, whereby the one-time diffracted beam Lb2 is imaged on the reflector 29 through the fourth imaging element 30. Also, the one-time diffracted beam Lb2 reflected off the reflector 29 is collimated at the fourth imaging element 30, and is irradiated on the diffraction grating 11R.

The one-time diffracted beam Lb1 is reflected off the reflector 26, thereby passing through the quarter-wave plate 28 twice to be irradiated on the diffraction grating 11R. Therefore, the one-time diffracted beam Lb1 which has been an S polarized beam is converted into a P polarized beam, and is irradiated on the diffraction grating 11R.

Similarly, the one-time diffracted beam Lb2 is reflected off the reflector 29, thereby passing through the quarter-wave plate 31 twice to be irradiated on the diffraction grating 11R. Therefore, the one-time diffracted beam Lb2 which has been a P polarized beam is converted into an S polarized beam, and is irradiated on the diffraction grating 11R.

Thus, the one-time diffracted beams Lb1 and Lb2 are irradiated on the diffraction grating 11R from the reflecting optical systems 16 and 17, respectively. The incident angles as viewed from the grating vectors of the one-time diffracted beams Lb1 and Lb2 are, as with the diffraction angles of the one-time diffracted beams Lb1 and Lb2, as shown in FIG. 13, δ. Also, the incident angles on the inclined plane m3 are, as with the diffraction angles, as shown in FIG. 12, β.

Upon the one-time diffracted beams Lb1 and Lb2 being irradiated on the diffraction grating 11R, two-time diffracted beams Lc1 and Lc2 are generated. The diffraction angles as viewed from the grating vector directions of the two-time diffracted beams Lc1 and Lc2 are, as with the incident angles of the coherent beams La1 and La2, as shown in FIG. 13, γ. Also, the diffraction angles on the inclined plane m2 are, as with the incident angles of the coherent beams La1 and La2, as shown in FIG. 12, α.

Accordingly, the two-time diffracted beam Lc1 is reflected off the reflector 23 and returns on the same optical path as the coherent beam La1 to input to the polarization beam splitter 22. Similarly, the two-time diffracted beam Lc2 is reflected off the reflector 24 and returns on the same optical path as the coherent beam La2 to input to the polarization beam splitter 22.

The two-time diffracted beam Lc1 input to the polarization beam splitter 22 is a P polarized beam and transmits through the polarization beam splitter 22. Also, the two-time diffracted beam Lc2 input to the polarization beam splitter 22 is an S polarized beam and reflects off the polarization beam splitter 22.

The two two-time diffracted beams Lc1 and Lc2 input to the polarization beam splitter 22 are overlapped by the polarization beam splitter 22 to interfere mutually. The interference beam Ld wherein the two two-time diffracted beams Lc1 and Lc2 interfere mutually is condensed through the second imaging element 25 and is input to the light receiving unit 13.

With the optical displacement measuring device 10C thus configured, the diffraction grating 11R moves in the grating vector direction according to the movement of the movable portion, thereby generating a phase difference between the two two-time diffracted beams Lc1 and Lc2. The optical displacement measuring device 10C causes the two two-time diffracted beams Lc1 and Lc2 to interfere mutually to detect an interference signal and obtains the phase difference between the two two-time diffracted beams Lc1 and Lc2 from this interference signal to detect the movement position of the diffraction grating 11R.

With the optical displacement measuring device 10C according to the third embodiment of the present invention, as to the reference plane m1, the irradiated light receiving optical system 15 is disposed on the inclined plane m2 having a predetermined inclined angle, and the reflecting optical systems 16 and 17 are disposed on the inclined plane m3, whereby the optical paths formed by the coherent beam and diffracted beams can be separated, and accordingly, the flexibility of device designing increases. Also, the optical displacement measuring device 10C can cause the one-time diffracted beams Lb1 and Lb2 to interfere mutually without mixing the 0-order diffracted beam and reflected beam from the grating plane 11a of the diffraction grating 11R in the irradiated light receiving optical system 15 and reflecting optical systems 16 and 17. Accordingly, position measurement can be performed with high precision.

With the optical displacement measuring device 10C, conditions for preventing a 0-order diffracted beam and reflected beam from mixing in the irradiated light receiving optical system 15 and reflecting optical systems 16 and 17 are as follows.

In a case where the angles $\gamma$ and $\delta$ are not zero, and are equal to the angles $\alpha$ and $\beta$, an arrangement may be made wherein the distance between incident points is increased to the extent to which a 0-order beam is not irradiated on the light receiving elements to irradiate the coherent beams La1 and La2 on the diffraction grating 11R.

Also, in a case where the angles $\gamma$ and $\delta$ are both zero, upon setting the angles $\alpha$ and $\beta$ equally, the optical paths are overlapped, so the angles $\alpha$ and $\beta$ have to be set differently. Also, in this case, the distance between incident points is increased to the extent to which a 0-order beam is not irradiated on the light receiving elements to irradiate the coherent beams La1 and La2 on the diffraction grating 11R.

On the other hand, in a case where the angles $\gamma$ and $\delta$ are not zero, and also the incident angles $\alpha$ and diffracted angle $\beta$ differ to the extent to which a 0-order beam is not irradiated on the light receiving elements, the incident point of the coherent beam La1 and the incident point of the coherent beam La2 can be set to the same position on the grating plane 11a of the diffraction grating 11R. In this case, as compared to a case where the incident points of the coherent beams La1 and La2 are separated by predetermined distance, influence due to the uneven thickness and uneven refractive index of the diffraction grating 11R can be reduced. Specifically, there is no optical path length difference between the one-time diffracted beams Lb1 and Lb2, or between the two-time diffracted beams Lc1 and Lc2, whereby position measurement can be performed with high precision.

Figure 14:
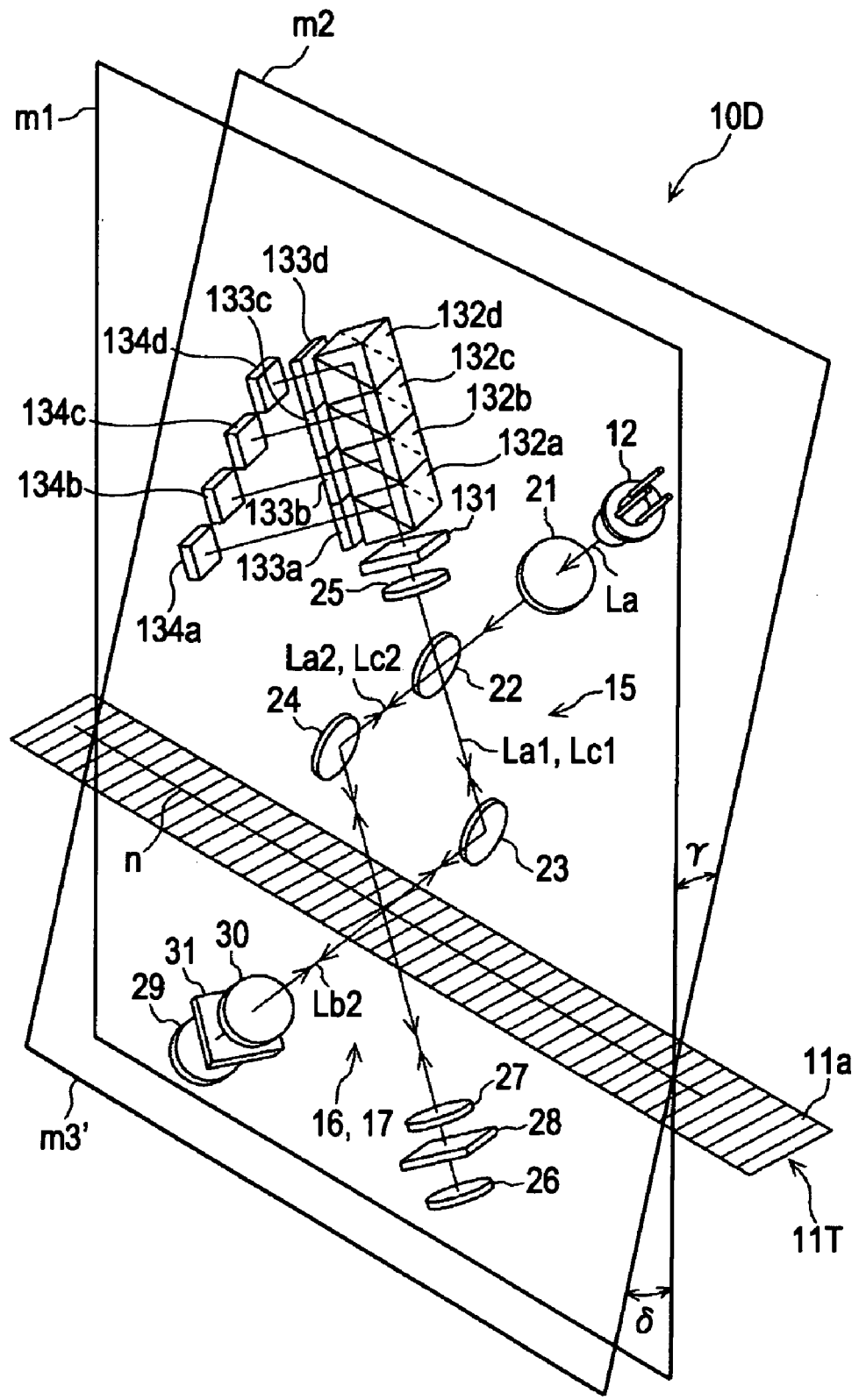
FIG. 14 is a schematic perspective view illustrating an example of an optical displacement measuring device according to a fourth embodiment of the present invention.

Configuration example of the optical displacement measuring device according to the fourth embodiment FIG. 14 is a schematic perspective view illustrating an example of an optical displacement measuring device according to a fourth embodiment. An optical displacement measuring device 10D according to the fourth embodiment includes a transmission-type diffraction grating 11T, and is configured such that a coherent beam is irradiated as to the diffraction grating 11T from a direction other than a direction perpendicular to the diffraction grating 11a.

Now, let us say that one imaginary line parallel to the grating vector directions on the grating plane 11a of the diffraction grating 11T is taken as a line n, an imaginary plane parallel to the normal vector including the line n is taken as a reference plane m1, an imaginary plane including the line n wherein an angle made up of the reference plane m1 is $\gamma$ is taken as an inclined plane m2, an imaginary plane including the line n wherein an angle made up of the reference plane m1 is $\delta$ is taken as an inclined plane m3', and the inclined plane m3' is an opposite side plane as to the inclined plane m2, across the grating plane 11a of the diffraction grating 11T.

Figure 15:
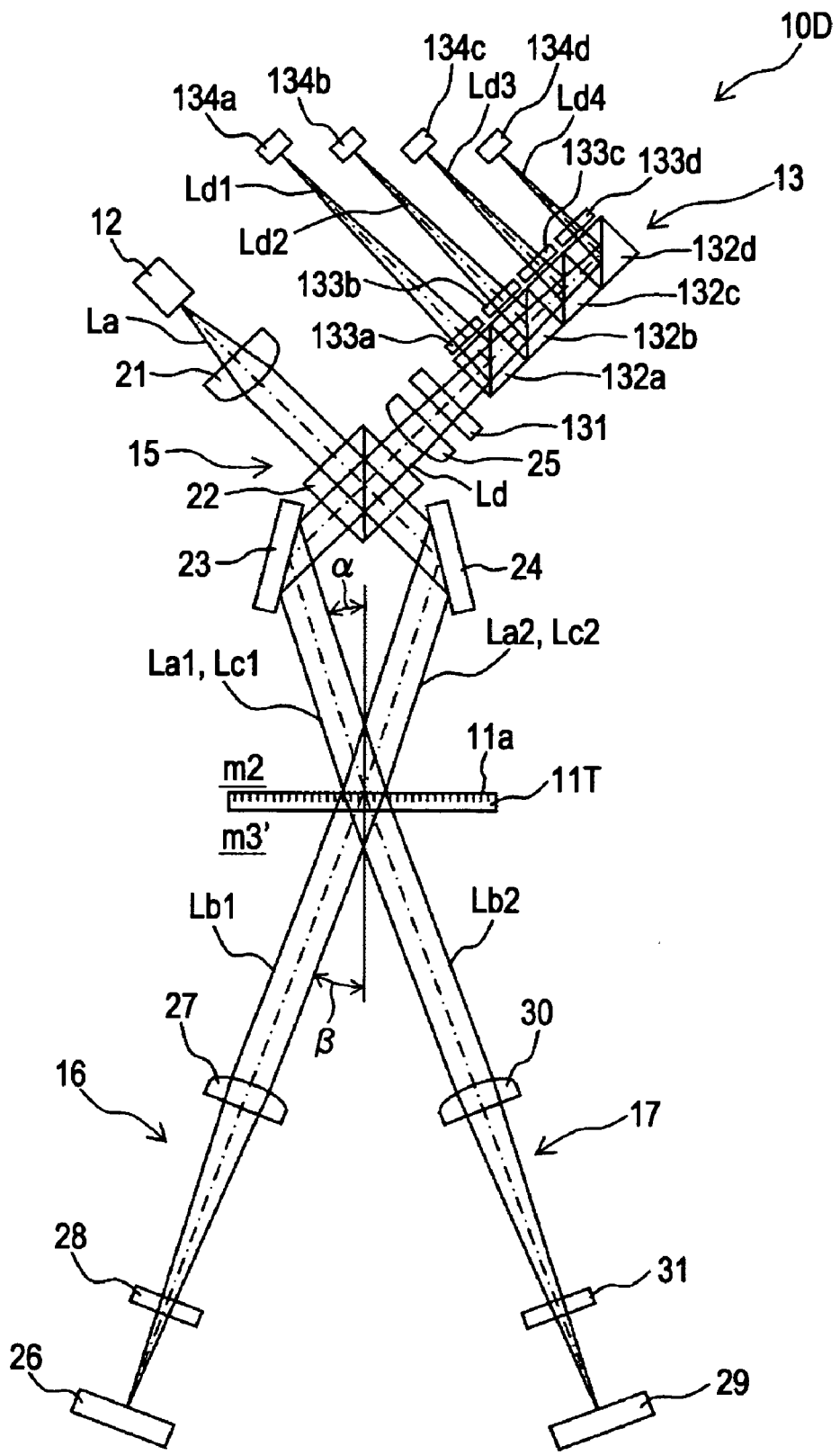
FIG. 15 is a side view of components disposed on the inclined planes m2 and m3' as viewed from a direction perpendicular to the inclined planes m2 and m3'.
Figure 16:
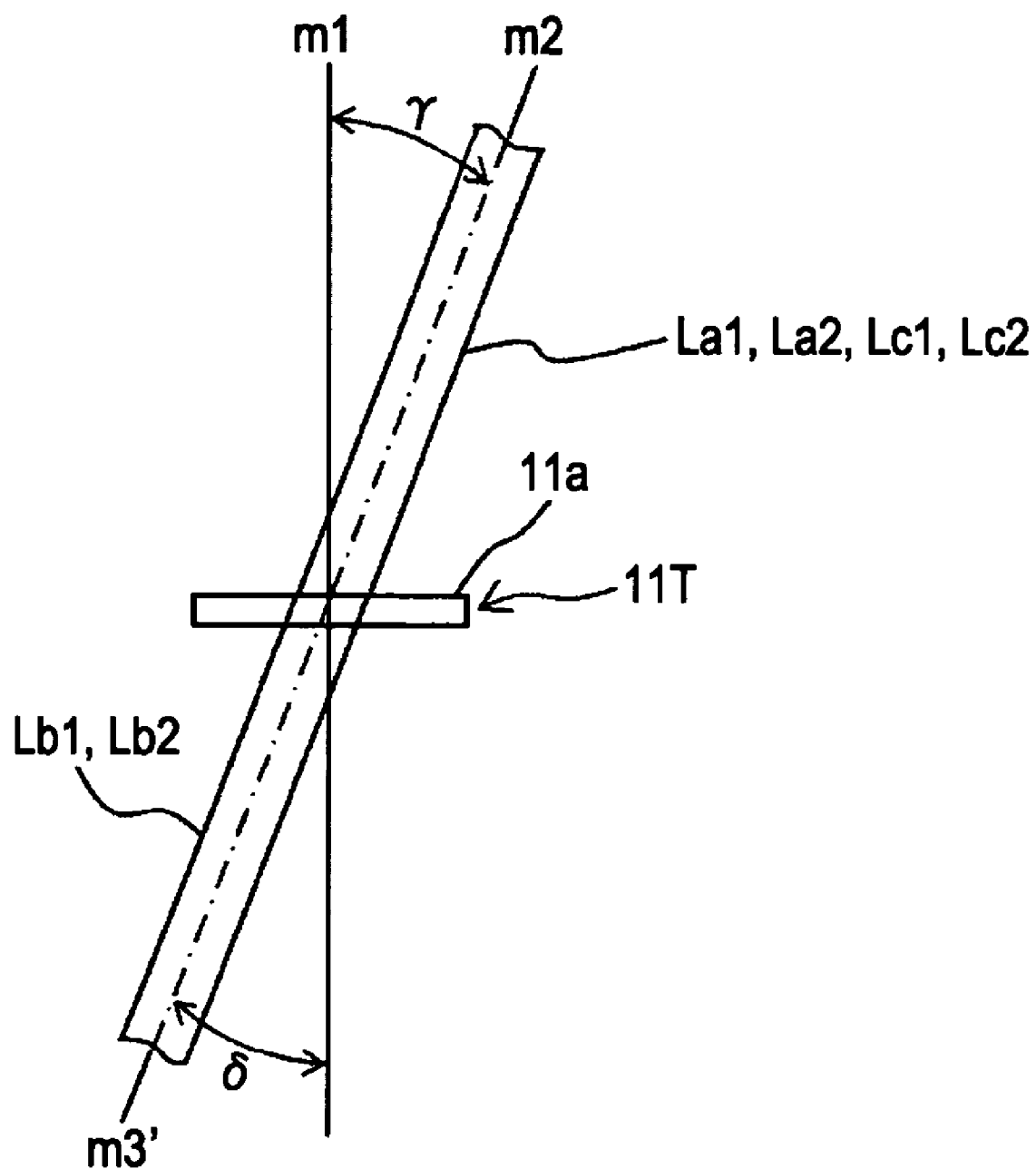
FIG. 16 is a front view of coherent beams input to the diffraction grating and diffracted beams diffracted by the diffraction grating as viewed from a grating vector direction.

FIG. 15 is a side view illustrating components disposed on the inclined planes m2 and m3' as viewed from a direction perpendicular to the inclined planes m2 and m3'. FIG. 16 is a front view of coherent beams input to the diffraction grating, and diffracted beams diffracted by the diffraction grating as viewed from the grating vector directions.

With the optical displacement measuring device 10D according to the fourth embodiment, the coherent beam source 12, light receiving unit 13, and irradiated light receiving optical system 15 are disposed on the inclined plane m2. Also, with the optical displacement measuring device 10D, the reflecting optical systems 16 and 17 are disposed on the inclined plane m3'.

The irradiated light receiving optical system 15 includes the first imaging element 21, polarization beam splitter 22, reflectors 23 and 24, and second imaging element 25. With the irradiated light receiving optical system 15, the respective components are disposed such that the coherent beam La emitted from the coherent beam source 12, the optical paths of the coherent beams La1 and La2 obtained by dividing the coherent beam La at the polarization beam splitter 22, and the optical paths of the two-time diffracted beams Lc1 and Lc2 diffracted at the diffraction grating 11R are formed on the inclined plane m2. Thus, with the coherent beams La1 and La2, and two-time diffracted beams Lc1 and Lc2, as shown in FIG. 13, the incident angle and diffraction angle as viewed from the grating vector directions become y.

The reflecting optical system 16 includes the reflector 26, third imaging element 27, and quarter-wave plate 28, and the diffraction grating 11T is disposed around one of the focal positions of the third imaging element 27. Also, the reflector 26 is disposed around the other focal position of the third imaging element 27. With the present example, the focal length F1 on the diffraction grating 11T side of the third imaging element 27, and the focal length F2 on the reflector 26 side of the third imaging element 27 are configured generally in the same way.

The reflecting optical system 17 includes the reflector 29, fourth imaging element 30, and quarter-wave plate 31, and the diffraction grating 11T is disposed around one of the focal positions of the fourth imaging element 30. Also, the reflector 29 is disposed around the other focal position of the fourth imaging element 30. With the present example, the focal length F3 on the diffraction grating 11T side of the fourth imaging element 30, and the focal length F4 on the reflector 29 side of the fourth imaging element 30 are configured generally in the same way, and also the focal length of the third imaging element 27 and the focal length of the fourth imaging element 30 are configured generally in the same way.

With the reflecting optical system 16, the respective components are disposed such that the optical path of the one-time diffracted beam Lb1 diffracted at the diffraction grating 11T, and reflected off the reflector 26 to reciprocate is formed on the inclined plane m3'. With the reflecting optical system 17, the respective components are disposed such that the optical path of the one-time diffracted beam Lb2 diffracted at the diffraction grating 11T and reflected off the reflector 29 to reciprocate is formed on the inclined plane m3'. Thus, with the one-time diffracted beams Lb1 and Lb2, as shown in FIG. 16, the incident angle and diffraction angle as viewed from the grating vector directions become S.

The light receiving unit 13 includes the quarter-wave plate 131; beam splitters 132a, 132b, 132c, and 132d; polarizers 133a, 133b, 133c, and 133d; and light receiving elements 134a, 134b, 134c, and 134d. With the configuration including these components as the light receiving unit 13, the optical path of the coherent beam Ld wherein the two-time diffracted beams Lc1 and Lc2 are overlapped at the polarization beam splitter 22 is formed on the inclined plane m2, so at least the quarter-wave plate 131 and beam splitters 132a, 132b, 132c, and 132d are disposed on this optical path.

Next, description will be made regarding the operation effects of the optical displacement measuring device 10D according to the fourth embodiment. The coherent beam La emitted from the coherent beam source 12 is collimated at the first imaging element 21 and is input to the polarization beam splitter 22.

The polarization beam splitter 22 divides the input coherent beam La into two coherent beams La1 and La2 having a different polarization direction. The coherent beam La1 reflected off the polarization beam splitter 22 is an S polarized beam, and the coherent beam La2 transmitted through the polarization beam splitter 22 is a P polarized beam.

The reflector 23 reflects the coherent beam La1 reflected off the polarization beam splitter 22 to irradiate this on a predetermined position of the grating plane 11a of the diffraction grating 11T. The reflector 24 reflects the coherent beam La2 transmitted through the polarization beam splitter 22 to irradiate this on a predetermined position of the grating plane 11a of the diffraction grating 11T.

The reflectors 23 and 24 irradiate the coherent beams La1 and La2 on predetermined positions on the grating plane 11a such that the incident angle on the inclined plane m2 becomes $\alpha$, as shown in FIG. 15, respectively. Note that the reflectors 23 and 24 are disposed such that the reflecting planes thereof face mutually. Therefore, with the coherent beams La1 and La2, the input directions thereof in the grating vector directions are mutually opposite directions.

The coherent beam La1 is diffracted by being irradiated on the diffraction grating 11T, whereby a one-time diffracted beam Lb1 is generated. The coherent beam La2 is diffracted by being irradiated on the diffraction grating 11T, whereby a one-time diffracted beam Lb2 is generated.

The diffraction angles of the one-time diffracted beams Lb1 and Lb2 are $\delta$ as shown in FIG. 16 in the case of viewing from the grating vector direction. That is to say, the one-time diffracted beams Lb1 and Lb2 are generated along the inclined plane m3'. Also, the diffraction angles on the inclined plane m3' of the one-time diffracted beams Lb1 and Lb2 are $\beta$ as shown in FIG. 15. Note that, with the one-time diffracted beams Lb1 and Lb2, the emission directions thereof in the grating vector direction are mutually opposite directions.

With the reflecting optical systems 16 and 17, as described above, the diffraction angles of the two one-time diffracted beams Lb1 and Lb2 are $\delta$ as viewed in the grating vector direction, so the respective components are disposed such that the optical paths of the passing one-time diffracted beams Lb1 and Lb2 are formed on the inclined plane m3'. Also, the reflectors 26 and 29 of the reflecting optical systems 16 and 17 are disposed at an angle whereby the one-time diffracted beams Lb1 and Lb2 diffracted at the diffraction angle $\beta$ on the inclined plane m3' can be reflected perpendicularly.

The reflector 26 is disposed on the focal position of the third imaging element 27, whereby the one-time diffracted beam Lb1 is imaged on the reflector 26 through the third imaging element 27. Also, the one-time diffracted beam Lb1 reflected off the reflector 26 is collimated at the third imaging element 27 and is irradiated on the diffraction grating 11T.

The reflector 29 is disposed on the focal position of the fourth imaging element 30, whereby the one-time diffracted beam Lb2 is imaged on the reflector 29 through the fourth imaging element 30. Also, the one-time diffracted beam Lb2 reflected off the reflector 29 is collimated at the fourth imaging element 30 and is irradiated on the diffraction grating 11T.

The one-time diffracted beam Lb1 is reflected off the reflector 26, thereby passing through the quarter-wave plate 28 twice to be irradiated on the diffraction grating 11T. Therefore, the one-time diffracted beam Lb1 which has been an S polarized beam is converted into a P polarized beam and is irradiated on the diffraction grating 11T.

Similarly, the one-time diffracted beam Lb2 is reflected off the reflector 29, thereby passing through the quarter-wave plate 31 twice to be irradiated on the diffraction grating 11T. Therefore, the one-time diffracted beam Lb2 which has been a P polarized beam is converted into an S polarized beam and is irradiated on the diffraction grating 11T.

Thus, the one-time diffracted beams Lb1 and Lb2 are irradiated on the diffraction grating 11T from the reflecting optical systems 16 and 17, respectively. The incident angles as viewed from the grating vectors of the one-time diffracted beams Lb1 and Lb2 are, as with the diffraction angles of the one-time diffracted beams Lb1 and Lb2, as shown in FIG. 16, $\delta$. Also, the incident angles on the inclined plane m3' are, as with the diffraction angles, as shown in FIG. 15, $\beta$.

Upon the one-time diffracted beams Lb1 and Lb2 being irradiated on the diffraction grating 11T, two-time diffracted beams Lc1 and Lc2 are generated. The diffraction angles as viewed from the grating vector directions of the two-time diffracted beams Lc1 and Lc2 are, as with the incident angles of the coherent beams La1 and La2, as shown in FIG. 16, $\gamma$. Also, the diffraction angles on the inclined plane m2 are, as with the incident angles of the coherent beams La1 and La2, as shown in FIG. 15, $\alpha$.

Accordingly, the two-time diffracted beam Lc1 is reflected off the reflector 23 and returns on the same optical path as the coherent beam La1 to input to the polarization beam splitter 22. Similarly, the two-time diffracted beam Lc2 is reflected off the reflector 24 and returns on the same optical path as the coherent beam La2 to input to the polarization beam splitter 22.

The two-time diffracted beam Lc1 input to the polarization beam splitter 22 is a P polarized beam and transmits through the polarization beam splitter 22. Also, the two-time diffracted beam Lc2 input to the polarization beam splitter 22 is an S polarized beam and reflects off the polarization beam splitter 22.

The two two-time diffracted beams Lc1 and Lc2 input to the polarization beam splitter 22 are overlapped by the polarization beam splitter 22 to interfere mutually. The interference beam Ld wherein the two two-time diffracted beams Lc1 and Lc2 interfere mutually is condensed through the second imaging element 25 and is input to the light receiving unit 13.

With the optical displacement measuring device 10D thus configured, the diffraction grating 11T moves in the grating vector direction according to the movement of the movable portion, thereby generating a phase difference between the two two-time diffracted beams Lc1 and Lc2. The optical displacement measuring device 10D causes the two two-time diffracted beams Lc1 and Lc2 to interfere mutually to detect an interference signal and obtains the phase difference between the two two-time diffracted beams Lc1 and Lc2 from this interference signal to detect the movement position of the diffraction grating 11T.

With the optical displacement measuring device 10D according to the fourth embodiment of the present invention, as to the reference plane m1, the irradiated light receiving optical system 15 is disposed on the inclined plane m2 having a predetermined inclined angle, and the reflecting optical systems 16 and 17 are disposed on the inclined plane m3', whereby the optical paths formed by the coherent beam and diffracted beams can be separated, and accordingly, the flexibility of device designing increases. Also, the optical displacement measuring device 10D can cause the one-time diffracted beams Lb1 and Lb2 to interfere mutually without mixing the 0-order diffracted beam and reflected beam from the grating plane 11a of the diffraction grating 11T in the irradiated light receiving optical system 15, and reflecting optical systems 16 and 17, and accordingly, position measurement can be performed with high precision.

With the optical displacement measuring device 10D, conditions for preventing a 0-order diffracted beam and reflected beam from mixing in the irradiated light receiving optical system 15, and reflecting optical systems 16 and 17 are as follows.

In a case where the angles $\gamma$ and $\delta$, are not zero and are equal to the angles $\alpha$ and $\beta$, an arrangement may be made wherein the distance between incident points is increased to the extent to which a 0-order beam is not irradiated on the light receiving elements to irradiate the coherent beams La1 and La2 on the diffraction grating 11T.

Also, in a case where the angles $\gamma$ and $\delta$ are both zero, the angles $\alpha$ and $\beta$ may be set equally or differently. Also, in either case of $\alpha=\beta$ or $\alpha\neq\beta$, the distance between incident points is increased to the extent to which a 0-order beam is not irradiated on the light receiving elements to irradiate the coherent beams La1 and La2 on the diffraction grating 11T.

On the other hand, in a case where the angles $\gamma$ and $X$ are not zero, and also the incident angles $\alpha$ and diffracted angle $\beta$ differ to the extent to which a 0-order beam is not irradiated on the light receiving elements, the incident point of the coherent beam La1 and the incident point of the coherent beam La2 can be set to the same position on the grating plane 11a of the diffraction grating 11T. In this case, as compared to a case where the incident points of the coherent beams La1 and La2 are separated by predetermined distance, influence due to the uneven thickness and uneven refractive index of the diffraction grating 11T can be reduced. Specifically, there is no optical path length difference between the one-time diffracted beams Lb1 and Lb2, or between the two-time diffracted beams Lc1 and Lc2, whereby position measurement can be performed with high precision.

Description will be made below regarding influence in a case where the diffraction grating 11(T, R) has uneven thickness. With the above-mentioned Expression (1), $\delta$ is quantity depending on the optical path difference between the two two-time diffracted beams Lc1 and Lc2 to be overlapped. Accordingly, upon this $\delta$ fluctuating, the intensity I of the interference signal fluctuates even if the diffraction grating 11(T, R) does not move, which becomes an error factor.

Figure 17:
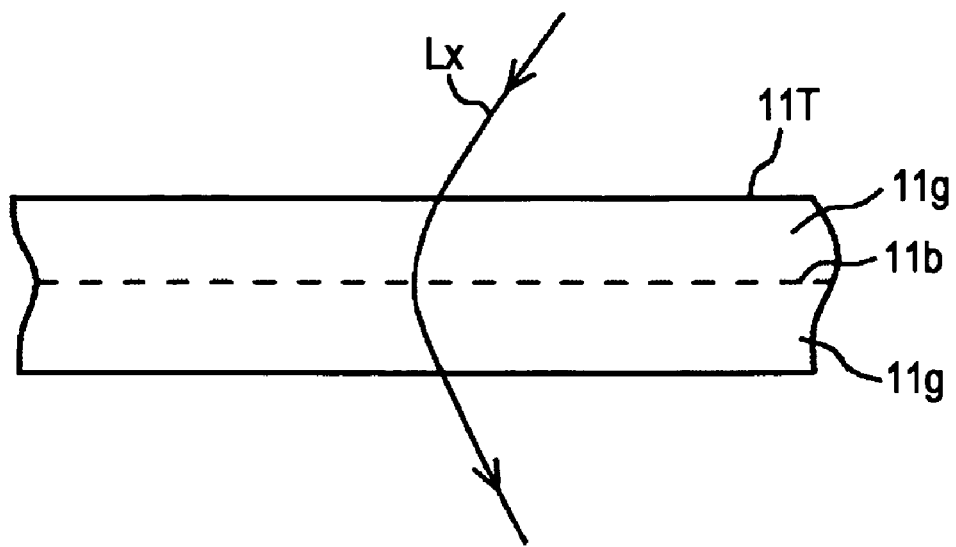
FIG. 17 is an explanatory diagram illustrating the optical path length of an optical beam passing through the diffraction grating.
Figure 18:
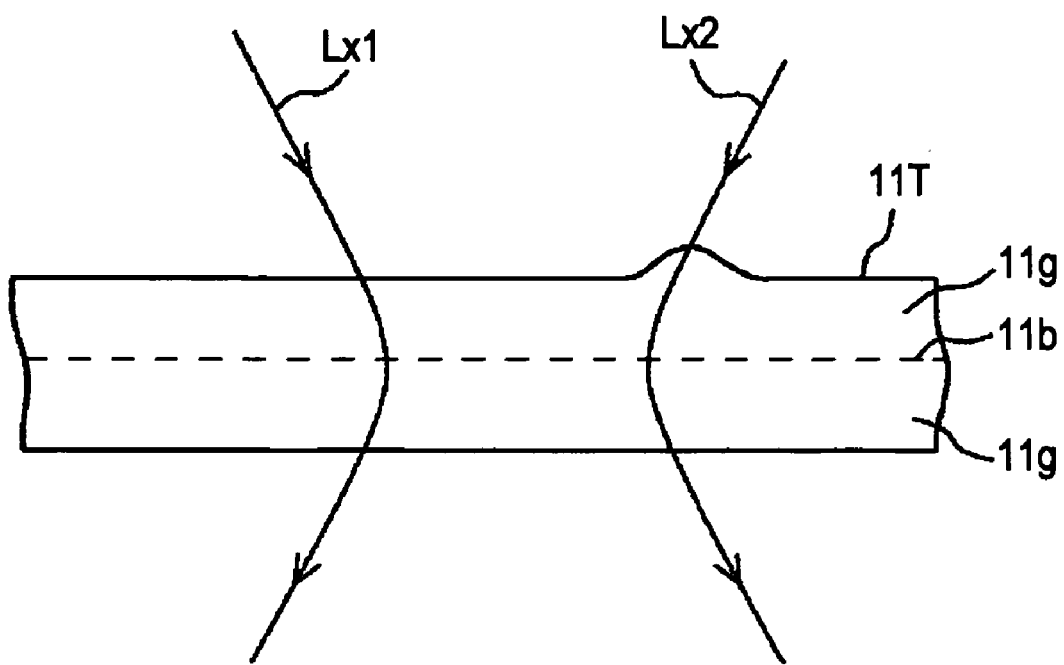
FIG. 18 is an explanatory diagram illustrating the difference between the optical path lengths of two optical beams passing through the diffraction grating having uneven thickness.

FIG. 17 is an explanatory diagram illustrating the optical path length of an optical beam passing through the diffraction grating. FIG. 18 is an explanatory diagram illustrating the difference between the optical path lengths of two optical beams passing through the diffraction grating having uneven thickness.

For example, as shown in FIG. 17, let us consider a case where the transmission-type diffraction grating 11T wherein a grating 11b is provided within glass 11g, has uneven thickness. If we say that the refractive index of the glass 11g is n, and the distance wherein a laser beam Lx passes from one surface of the glass 11g to the other surface thereof is L, the optical length when the laser beam Lx passes through the diffraction grating 11T is nL.

The diffractive index of the air is generally 1, so the optical path length when the laser beam Lx passes through the diffraction grating 11T is extended by $(n-1)L$ as compared to the optical path length when the laser beam Lx passes through the air by the same distance.

Accordingly, if we say that the thickness of the glass 11g of the diffraction grating 11T changes, and the distance wherein the laser beam Lx passes from one surface of the glass 11g to the other surface changes to $L+\Delta L$, the optical length changes by $(n-1)\Delta L$. Particularly, in the case of two-time diffraction, the glass is transmitted twice, so the optical length changes by $2(n-1)\Delta L$.

Taking this into consideration, for example, as shown in FIG. 18, let us consider two laser beams wherein one laser beam Lx1 transmits a position where the thickness of the diffraction grating 11T is even, and the other Lx2 transmits a position where the thickness of the diffraction grating 11T is uneven.

If we say that the length wherein the laser beam Lx2 passes through the uneven thickness is $+\Delta L$, the optical path difference between the two laser beams Lx1 and Lx2 is $(n-1)\Delta L$. Accordingly, the $\delta$ shown in the above-mentioned Expression (1) changes by $\{(n-1)\Delta L\}\cdot 2\pi/\lambda$ ($\lambda$ is the wavelength of the laser beam).

In the case of performing two-time diffraction, the S becomes $\{2(n-1)\Delta L\}\,2\pi/\lambda$, the error quantity of position detection becomes $(\Lambda/2\lambda)(n-1)\Delta L$. For example, if we say that $\Lambda=0.55$ μm, $\lambda=0.78$ μm, $n=1.5$, and $\Delta L=1$ μm, the error quantity becomes around 0.18 μm. Accordingly, this error becomes a quite great value, for example, in a case where position detection of nanometer order is performed.

Note that description has been made so far regarding the transmission-type diffraction grating 11T as an example, but with regard to the reflection-type diffraction grating 11R as well, if the grating is covered with glass, error occurs similarly, and also, if the grating is not covered with glass, change in the passage distance of the laser beam due to unevenness directly becomes change in the optical path length, and error occurs. Thus, in a case where the diffraction grating 11(T, R) has uneven thickness, if the incident points of the coherent beams La1 and La2 are apart by predetermined distance, error occurs.

Therefore, with the optical displacement measuring devices 10C and 10D, as to the reference plane m1, the irradiated light receiving optical system 15 is disposed on the inclined plane m2 having a predetermined inclined angle, and the reflecting optical systems 16 and 17 are disposed on the inclined plane m3 or the inclined plane m3'. Subsequently, the coherent beams La1 and La2 are input to the same point on the diffraction grating 11T or 11R, whereby error due to the uneven thickness and uneven refractive index of the diffraction grating 11T or 11R can be eliminated, and accordingly, the position can be detected with even higher precision.

Specifically, error due to the uneven thickness and uneven refractive index of the diffraction grating 11T or 11R occurs since the coherent beams La1 and La2 pass through different positions, and in a case where the coherent beams La1 and La2 pass through the same point, this error does not occur, and accordingly, if the coherent beams La1 and La2 are input to the same point, the position can be detected with high precision.

Also, for example, when the diffraction grating 11T or 11R is covered with glass or the like, it is difficult to cause the two coherent beams La1 and La2 to pass through completely the same optical path, but if the coherent beams La1 and La2 are input to generally the same position on the grating plane 11a, error can be reduced to the minimum.

The relations between the incident angle (and the diffraction angle of a two-time diffracted beam) $\alpha$, $\gamma$ of a coherent beam, and the diffraction angle (and the incident angle of a one-time diffracted beam) $\beta$, $\delta$ of a one-time diffracted beam are such as shown in the following Expressions (6) and (7).

$$\sin \alpha + \sin \beta = m\lambda/d \qquad (6)$$

$$\sin \alpha/\sin \delta = \cos \beta/\cos \alpha \qquad (7)$$

Here, d denotes the pitch of the diffraction grating, $\lambda$ denotes the wavelength of an optical beam, and m denotes a diffraction order.

Accordingly, in the case of $\alpha=\beta$, $\gamma=\delta$ holds, and in the case of $\alpha \neq \beta$, $\gamma \neq \delta$ holds.

Modification of the optical displacement measuring devices according to the respective embodiments Description has been made so far regarding the optical displacement measuring devices to which the first through fourth embodiments of the present invention have been applied. With the optical displacement measuring device according to each embodiment, the diffraction grating 11(T or R) wherein gratings are provided in parallel with a predetermined interval is employed, but the present invention is not restricted to such a diffraction grating wherein gratings are provided in parallel.

Figure 19:
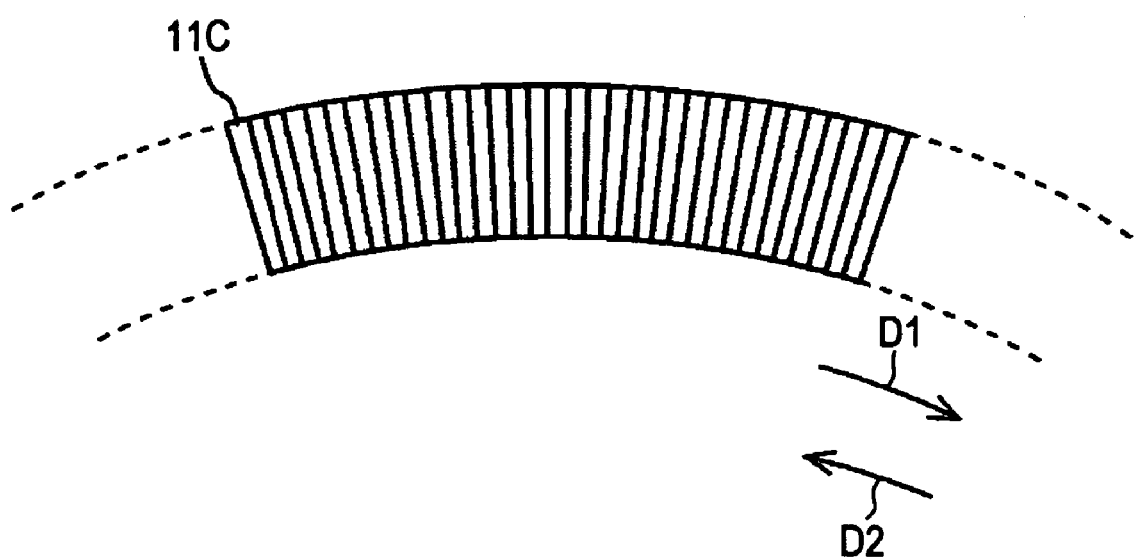
FIG. 19 is a configuration diagram illustrating a modification of the diffraction grating.

FIG. 19 is a configuration diagram illustrating a modification of the diffraction grating. For example, as shown in FIG. 19, a diffraction grating 11C may be employed wherein gratings are provided radially. Such a diffraction grating 11C wherein gratings are provided radially is employed, whereby the position of a movable portion such as a tooling machine which rotationally moves as a so-called rotary encoder, or the like, can be detected. Also, with the present invention, an amplitude-type diffraction grating which recorded contrasting, or a phase-type diffraction grating which recorded change in a refractive index or change in a shape, may be employed, i.e., the type of diffraction grating thereof is not restricted.

Also, with the optical displacement measuring device according to each embodiment, description has been made regarding a case where the diffraction grating 11(T or R) is attached to a movable portion such as a tooling machine or the like, and the diffraction grating 11(T or R) moves according to the movement of the movable portion, but with the present invention, the irradiated light receiving optical system, reflecting optical system, and diffraction grating 11(T or R) should move relatively. For example, with the present invention, an arrangement may be made wherein the diffraction grating is fixed, and the irradiated light receiving optical system and reflecting optical system move according to the movement of the movable portion such as a tooling machine or the like.

Also, a half mirror, beam splitter, imaging element, and so forth employed in the optical displacement measuring device according to each embodiment are not restricted to an element or lens or the like which employs a thin film, e.g., a diffracted optical element may be employed.

Figure 20:
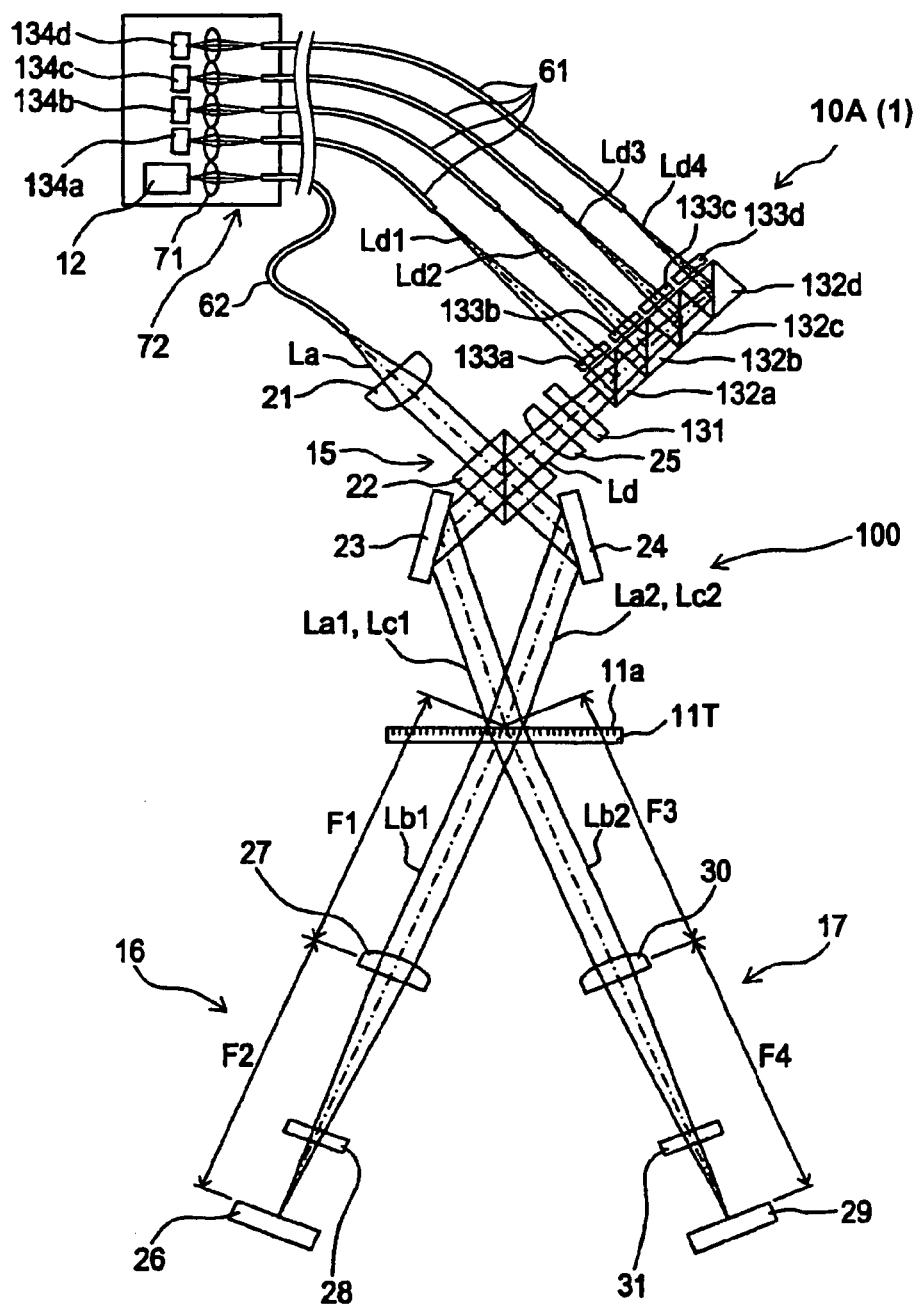
FIG. 20 is a configuration diagram illustrating a modification of the optical displacement measuring devices according to the respective embodiments of the present invention.

FIG. 20 is a configuration diagram illustrating a modification of the optical displacement measuring device according to each embodiment of the present invention. As described above, with the optical displacement measuring devices 10A through 10D according to the respective embodiments, the interference beam Ld wherein the two-time diffracted beams Lc1 and Lc2 are overlapped at the polarization beam splitter 22 is imaged on the light receiving face by employing the second imaging element 25, the vignetting of a beam does not occur on the light receiving face.

Thus, the interference beam Ld can be connected to an optical fiber or the like, and the light receiving unit can be separated from the optical displacement measuring devices 10A through 10D.

An optical displacement measuring device 10A(1) according to a modification, shown in FIG. 20 has a configuration wherein with the optical displacement measuring device 10A according to the first embodiment; light receiving elements 134a, 134b, 134c, and 134d are connected to the measuring device main unit 100 by an optical fibers 61, and also the coherent beam source 12 is connected to the measuring device main unit 100 by an optical fiber 62.

The optical displacement measuring device 10A(1) according to a modification includes the coherent beam source 12, light receiving elements 134a, 134b, 134c, and 134d, and an optical module 72 including an optical element 71 and so forth. The optical module 72 images the coherent beam La emitted from the coherent beam source 12 on the end face of the optical fiber 62 by the optical element 71 such as a lens or the like and connects the coherent beam source 12 and optical fiber 62 optically.

Also, the optical module 72 images the coherent beams Ld1, Ld2, Ld3, and Ld4 emitted from the optical fibers 61 on the light receiving faces of the light receiving elements 134a, 134b, 134c, and 134d by the optical element 71 such as a lens or the like, and connects the light receiving elements 134a, 134b, 134c, and 134d, and the optical fibers 61 optically, respectively.

Note that, with a configuration wherein the interference beam Ld is divided into four by the beam splitters 132a, 132b, 132c, and 132d which are disposed in a line, the distances from the respective beam splitters to the focal position of the second imaging element 25 differs according to the distance differences between the second imaging element 25 and the respective beam splitters.

Therefore, with the configuration wherein the interference beams Ld1, Ld2, Ld3, and Ld4 divided into four by the beam splitters 132a, 132b, 132c, and 132d are connected to the optical fibers 61, the end face position of each optical fiber 61 is shifted and disposed in accordance with the distance from each beam splitter to the focal position of the second imaging element 25. Thus, the vignetting of a beam can be prevented from occurring on the end face of each optical fiber 61.

With the optical displacement measuring device 10A(1) according to a modification, the measuring device main unit 100 including the diffraction grating 11T to be attached to the movable portion such as a tooling machine or the like; various types of optical component for obtaining the interference beam Ld; and the optical module 72 for performing photoelectric conversion are connected by the optical fibers to separate these, whereby a position detecting unit and so forth for performing processing of an electric signal and the optical module 72 can be mounted in close proximity.

Thus, the electric communication unit can be shortened, and accordingly, detecting of a position can be performed at even higher speed. Note that the optical displacement measuring devices according to the other embodiments can also connect with both of the coherent beam source and light receiving element, or one of these by the optical fiber.

Figure 21:
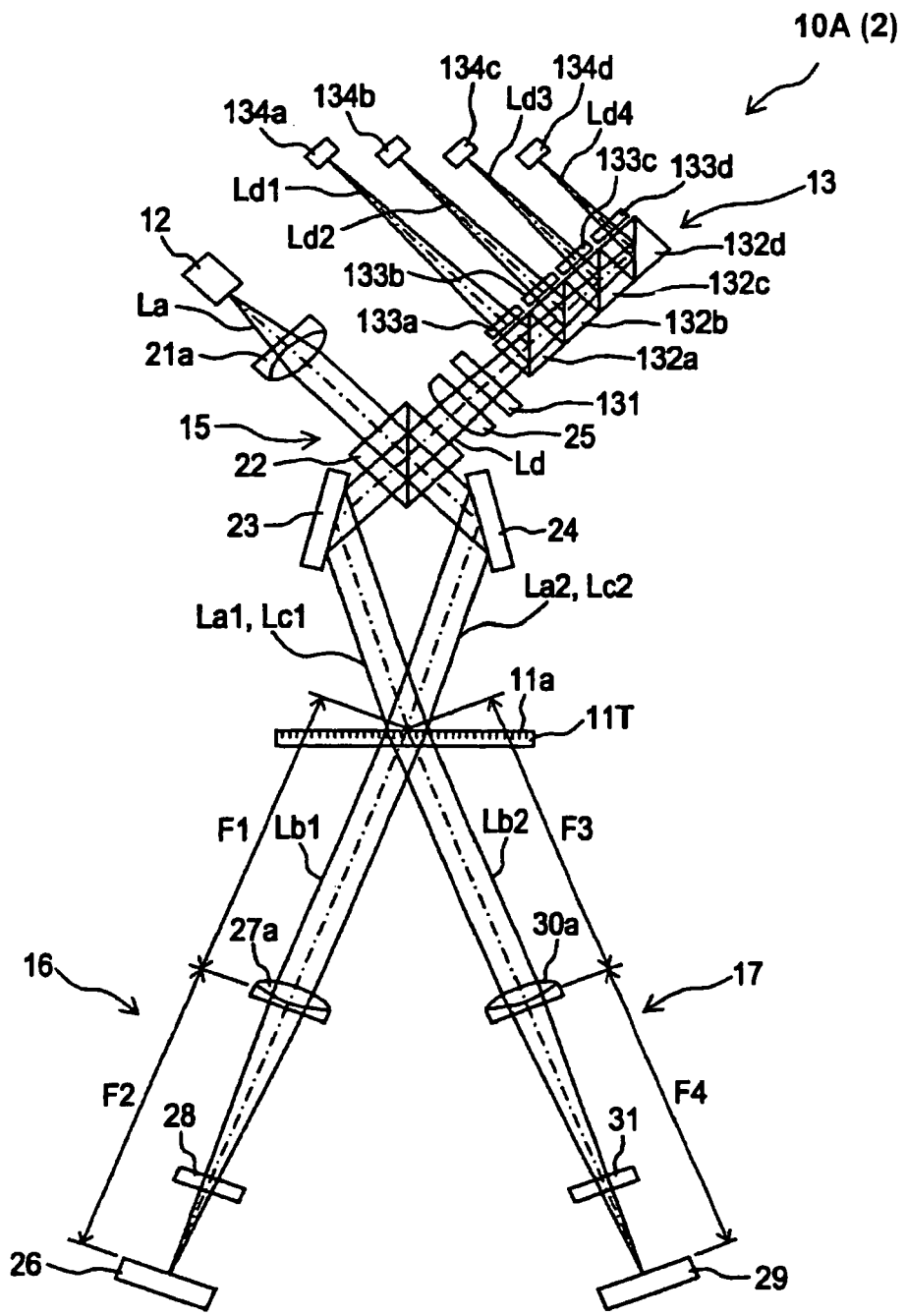
FIG. 21 is a configuration diagram illustrating another modification of the optical displacement measuring devices according to the respective embodiments of the present invention.

FIG. 21 is a configuration diagram illustrating another modification of the optical displacement measuring devices according to the respective embodiments. An optical displacement measuring device 10A(2) according to another modification has a configuration wherein, with the optical displacement measuring device 10A according to the first embodiment, a first imaging element 21a made up of an achromatizing lens is provided, and also a third imaging element 27a and a fourth imaging element 30a, which are made up of an achromatizing lens, are provided.

An achromatizing lens is an example of an achromatizing optical element, and is a lens wherein a convex lens made up of crown glass with relatively small dispersion, and a concave lens made up of flint glass with great dispersion are glued together.

The third imaging element 27a and the fourth imaging element 30a are configured of an achromatizing lens, whereby fluctuation of a focal position as to wavelength variations at the coherent beam source 12 due to change in temperature or the like can be suppressed. Also, the first imaging element 21a is configured of an achromatizing lens, whereby fluctuation of a focal position as to wavelength variations of a coherent beam due to change in temperature or the like can be suppressed. Note that, with the optical displacement measuring devices according to the other embodiments as well, the first imaging element and both of or one of the third imaging element and the fourth imaging element can be configured of an achromatizing lens.

The present application contains subject matter related to that disclosed in Japanese Priority Patent Application JP 2008-105047 filed in the Japan Patent Office on Apr. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical displacement measuring device comprising:
a diffraction grating configured to move relatively in a direction parallel to a grating vector so as to a coherent beam to be irradiated to diffract said coherent beam;
a light emitting unit configured to emit said coherent beam;
an irradiated light receiving optical system configured to divide said coherent beam emitted from said light emitting unit into two coherent beams, irradiate each of said two coherent beams on said diffraction grating to generate two one-time diffracted beams, and cause two two-time diffracted beams to be generated by diffracting said two one-time beams through said diffraction grating to interfere with each other;
a reflecting optical system configured to irradiate each of said two one-time diffracted beams on said diffraction grating; and
a light receiving unit configured to receive an interference beam obtained by causing said two two-time diffracted beams to interfere with each other by said irradiated light receiving optical system to detect an interference signal;
wherein said irradiated light receiving optical system includes
a first imaging element configured to condense said coherent beam emitted from said light emitting unit, and
a second imaging element configured to image said two two-time diffracted beams diffracted at said diffraction grating;
and wherein said reflecting optical system includes
a third imaging element between one reflector and said diffraction grating, said third imaging element configured to irradiate one of said two one-time diffracted beams on said diffraction grating, and
a fourth imaging element between the other reflector and said diffraction grating, said fourth imaging element configured to irradiate the other of said two one-time diffracted beams on said diffraction grating;
and wherein said third imaging element and said fourth imaging element have the same focal length, said diffraction grating is disposed in one focal position of said third imaging element and said fourth imaging element, and one of said reflectors is disposed in the other focal position of said third imaging element, and the other of said reflectors is disposed in the other focal position of said fourth imaging element.

2. The optical displacement measuring device according to claim 1, said first imaging element comprising:
an optical element configured to change said coherent beam emitted from said light emitting unit into a collimated beam.

3. The optical displacement measuring device according to claim 2, wherein said irradiated light receiving optical system irradiates each of said two coherent beams on said diffraction grating in a direction other than a direction perpendicular to a grating plane of said diffraction grating.

4. The optical displacement measuring device according to claim 2, further comprising:
an astigmatism optical element between said first imaging element and said diffraction grating.

5. The optical displacement measuring device according to claim 4, wherein the focal length of said astigmatism optical element is matched with the focal lengths of said third imaging element and said fourth imaging element, and said diffraction grating is disposed around one of the focal positions of said third imaging element and said fourth imaging element, and also around the focal position of said astigmatism optical element.

6. The optical displacement measuring device according to claim 2, said irradiated light receiving optical system comprising:
a polarization beam splitter configured to divide said coherent beam into two coherent beams having a different polarization direction, and also overlap said two two-time diffracted beams having a different polarization direction;
wherein said light receiving unit includes
a wave plate configured to convert said two two-time diffracted beams overlapped by said polarization beam splitter into circular polarized beams mutually in an opposite direction,
an optical dividing element configured to divide said two two-time diffracted beams converted into circular polarized beams into four,
a polarizer configured to provide an optical axis to each of synthesized waves between the circular polarized beams divided into four by said optical diving element,
a light receiving element configured to receive each beam obtained by being divided into four by said optical dividing element, of which the optical axis is changed by said polarizer, and a position detecting unit configured to obtain the differential output of interference intensity of one of said two-time diffracted beam converted into an electric signal by said light receiving element to detect the relative movement position of said diffraction grating.

7. The optical displacement measuring device according to claim 2, wherein said diffraction grating is a transmitting type or a reflecting type.

8. The optical displacement measuring device according to claim 2, wherein said diffraction grating is formed with a radial grating.

9. The optical displacement measuring device according to claim 2, wherein said third imaging element and said fourth imaging element are configured of an achromatizing optical element for suppressing fluctuation of a focal point as to wavelength variations.

10. The optical displacement measuring device according to claim 2, wherein said first imaging element is configured of an achromatizing optical element for suppressing fluctuation of a focal point as to wavelength variations of said coherent beam.

11. The optical displacement measuring device according to claim 2, wherein an optical fiber is disposed between said position detecting unit element and said light receiving element, and said second imaging element images said two two-time diffracted beams on the end portion of said optical fiber.

12. The optical displacement measuring device according to claim 11, wherein said coherent beam emitted from said light emitting unit is supplied to said irradiated light receiving optical system by said optical fiber.

* * * * *